United States Patent
Mukhopadhyaya et al.

(10) Patent No.: US 10,546,168 B1
(45) Date of Patent: Jan. 28, 2020

(54) MANAGING A PLURALITY OF TAG READER DEVICES

(71) Applicant: Accenture Global Solutions Limited, Dublin (IE)

(72) Inventors: Sudipta Mukhopadhyaya, Bangalore (IN); Mahesh Oni, Hunnur (IN); Subhasish Roy, Upar Kuai (IN); Prateek Singh, Lucknow (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/037,929

(22) Filed: Jul. 17, 2018

(51) Int. Cl.
*G06K 7/10* (2006.01)
*H04W 4/80* (2018.01)
*G06K 7/14* (2006.01)

(52) U.S. Cl.
CPC ..... *G06K 7/10475* (2013.01); *G06K 7/10297* (2013.01); *G06K 7/1447* (2013.01); *H04W 4/80* (2018.02)

(58) Field of Classification Search
CPC ................ G06K 7/10475; G06K 7/10297
USPC ....................................................... 340/10.1
See application file for complete search history.

(56) References Cited

U.S. PATENT DOCUMENTS

| | | | | |
|---|---|---|---|---|
| 9,313,455 | B1 * | 4/2016 | Moeeni | H04N 7/15 |
| 9,870,660 | B1 * | 1/2018 | Patterson | G07C 9/00111 |
| 2004/0135674 | A1 * | 7/2004 | Shanks | G06K 7/0008 |
| | | | | 340/10.1 |
| 2006/0283930 | A1 | 12/2006 | Shafer | |
| 2007/0103303 | A1 * | 5/2007 | Shoarinejad | G01S 19/05 |
| | | | | 340/572.1 |
| 2008/0042807 | A1 * | 2/2008 | Park | G06K 17/0022 |
| | | | | 340/10.3 |
| 2009/0256682 | A1 * | 10/2009 | Tu | G06Q 10/087 |
| | | | | 340/10.1 |
| 2010/0134289 | A1 * | 6/2010 | Oh | G06K 7/0008 |
| | | | | 340/572.1 |
| 2015/0379860 | A1 * | 12/2015 | Vardi | G08B 25/10 |
| | | | | 340/8.1 |

FOREIGN PATENT DOCUMENTS

WO      2016168006 A1      10/2016

OTHER PUBLICATIONS

Extended European Search Report for Application No. EP19186402. 4, dated Sep. 23, 2019, 8 pages.

* cited by examiner

*Primary Examiner* — Vernal U Brown
(74) *Attorney, Agent, or Firm* — Harrity & Harrity, LLP

(57) ABSTRACT

A device receives, from a tag reader device of a plurality of tag readers, information associated with a scan of a tag, where each of the plurality of tag readers is configured to read a different type of tag. The device determines, based on the information associated with the scan, a tag reader type associated with the tag reader device, where the plurality of tag readers is associated with a corresponding plurality of tag reader types. The device includes a plurality of parsers associated with the plurality of tag reader types, and identifies a parser, included in the device, associated with the tag reader type associated with the tag reader device. The device determines, using the parser, a tag identifier based on the information associated with the scan. Based on determining that the tag identifier is valid, the device transmits the information associated with the scan to a server.

20 Claims, 13 Drawing Sheets

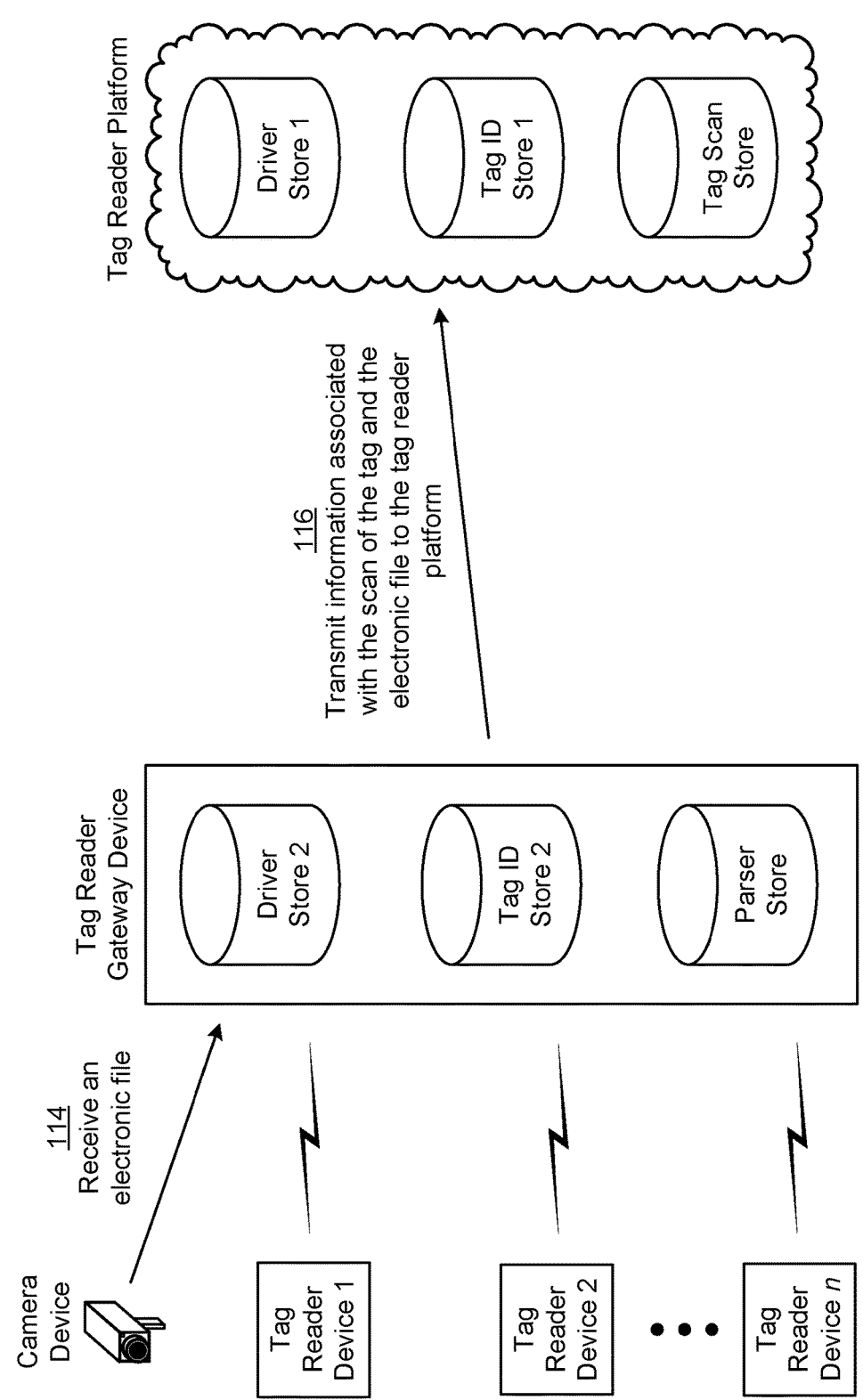

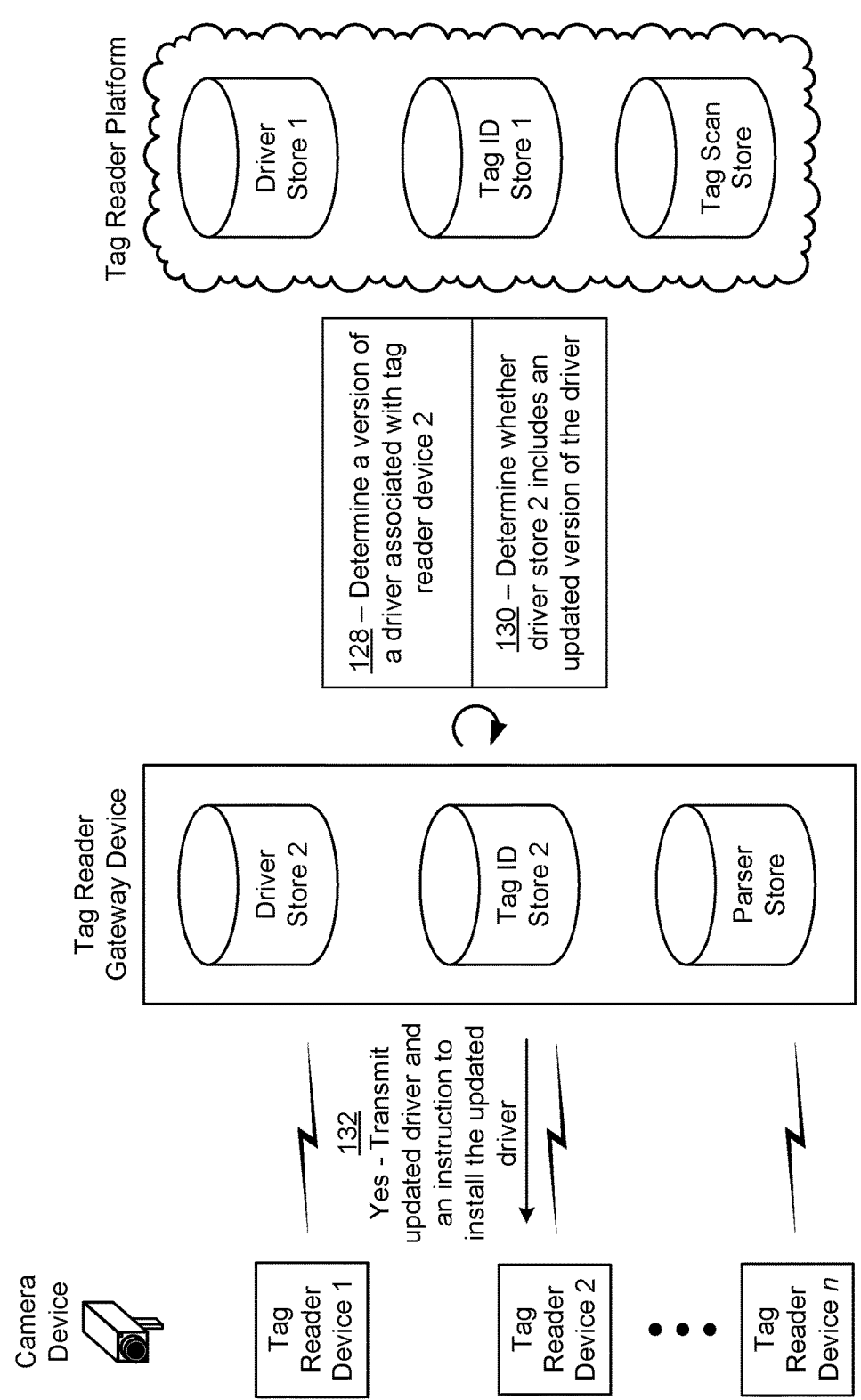

MANAGING A PLURALITY OF TAG READER DEVICES

BACKGROUND

A tag reader device may scan a tag, such as a barcode tag, a radio frequency identification (RFID) tag, a Bluetooth tag, and/or the like, to obtain information represented by the tag. The information represented by the tag may include information associated with an asset, information associated with a user, information that is used to verify authorization to access an object and/or a particular place, and/or the like.

SUMMARY

According to some implementations, a device may include one or more memories, and one or more processors, communicatively coupled to the one or more memories, to receive, from a tag reader device of a plurality of tag readers, information associated with a scan of a tag, wherein the device is in communication with the plurality of tag readers, wherein each of the plurality of tag readers is configured to read a different type of tag. The one or more processors may determine, based on the information associated with the scan of the tag, a tag reader type associated with the tag reader device, wherein the plurality of tag readers is associated with a corresponding plurality of tag reader types. The one or more processors may identify a parser, included in the device, associated with the tag reader type associated with the tag reader device, wherein the device includes a plurality of parsers associated with the plurality of tag reader types. The one or more processors may determine, using the parser, a tag identifier based on the information associated with the scan of the tag, and may determine whether the tag identifier is valid. The one or more processors may transmit, to a server and based on determining that the tag identifier is valid, the information associated with the scan of the tag.

According to some implementations, a non-transitory computer-readable medium may store instructions that include one or more instructions that, when executed by one or more processors of a device, cause the one or more processors to receive, from a tag reader device of a plurality of tag readers, information associated with a scan of a tag, wherein the device is in communication with the plurality of tag readers, and wherein each of the plurality of tag readers is configured to read a different type of tag. The one or more instructions may cause the one or more processors to determine, based on the information associated with the scan of the tag, a tag reader type associated with the tag reader device, wherein the plurality of tag readers is associated with a corresponding plurality of tag reader types. The one or more instructions may cause the one or more processors to identify a parser associated with the tag reader type associated with the tag reader device, wherein the device includes a plurality of parsers associated with the plurality of tag reader types. The one or more instructions may cause the one or more processors to determine, using the parser, a tag identifier based on the information associated with the scan of the tag, and to determine whether the tag identifier is valid. The one or more instructions may cause the one or more processors to transmit, to a server and based on determining that the tag identifier is valid, the information associated with the scan of the tag.

According to some implementations, a method may include receiving, at a device and from a tag reader device of a plurality of tag readers, information associated with a scan of a tag, wherein the device is in communication with the plurality of tag readers, and wherein each of the plurality of tag readers is configured to read a different type of tag. The method may include determining, by the device and based on the information associated with the scan of the tag, a tag reader type associated with the tag reader device, wherein the plurality of tag readers is associated with a corresponding plurality of tag reader types. The method may include identifying, by the device, a parser included in the device, wherein the device includes a plurality of parsers associated with the plurality of tag reader types. The method may include determining, by the device and using the parser, a tag identifier based on the information associated with the scan of the tag. The method may include determining by the device and based on determining the tag identifier, whether information identifying the tag identifier is included in a data store accessible by the device, and determining, by the device, that the tag identifier is valid based on determining that the information identifying the tag identifier is included in the data store accessible by the device. The method may include transmitting, by the device and based on determining that the tag identifier is valid, the information associated with the scan of the tag to a server to permit the server to analyze the information associated with the scan of the tag.

BRIEF DESCRIPTION OF THE DRAWINGS

FIGS. 1A-1G are diagrams of an example implementation described herein.

DETAILED DESCRIPTION

Figure 1A:
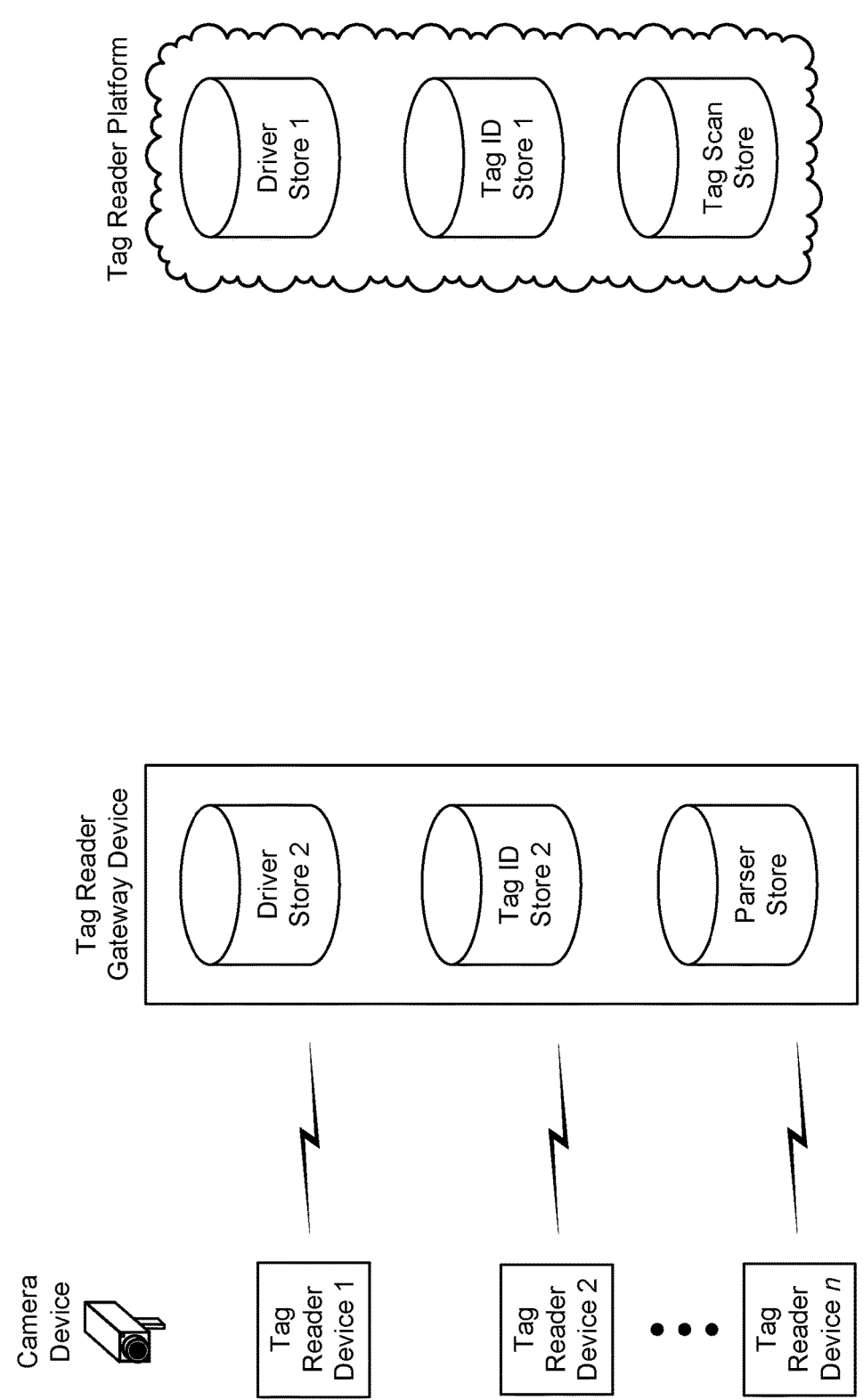

The following detailed description of example implementations refers to the accompanying drawings. The same reference numbers in different drawings may identify the same or similar elements.

A tag reader device may scan a tag, which may include a machine-readable representation of data, such as a barcode tag, a RFID tag, and/or the like, and may provide information, associated with the scan of the tag, to a tag reader gateway device based on scanning the tag. In some cases, a network may include a plurality of tag reader devices. The plurality of tag reader devices may be associated with a plurality of tag reader types. For example, a first tag reader device, of the plurality of tag reader devices, may be a barcode tag reader device, a second tag reader device, of the plurality of tag reader devices, may be a RFID tag reader device, and so on.

In some cases, each tag reader device, of the plurality of tag reader devices, that is associated with a particular tag reader type may be managed by a particular tag reader gateway device. For example, a barcode tag reader device may be communicatively connected with, and managed by, a barcode tag reader gateway device, a RFID tag reader device may be communicatively connected with, and managed by, a RFID tag reader gateway device, and so on. Each of the particular tag reader gateway devices may be communicatively connected with a tag reader platform so that each of the particular tag reader gateway devices may transmit, to the tag reader platform, information associated with scans of tags.

Some implementations described herein provide a tag reader gateway device that is capable of managing a plurality of tag reader devices in a network that are configured to read a respective, different type of tag. The tag reader gateway device may receive, from a tag reader device of the plurality of tag reader devices, information associated with a scan of a tag. The tag reader gateway device may determine, based on the information associated with the scan of the tag, a tag reader type associated with the tag reader device. The plurality of tag reader devices may be associated with a corresponding plurality of tag reader types. The tag reader gateway device may identify a parser, included in the tag reader gateway device, associated with the tag reader type associated with the tag reader device, wherein the tag reader gateway device may include a plurality of parsers associated with the plurality of tag reader types. The tag reader gateway device may determine, using the parser, a tag identifier based on the information associated with the scan of the tag, and may determine whether the tag identifier is valid. The tag reader gateway device may transmit the information associated with the scan of the tag to a server based on determining that the tag identifier is valid.

In this way, the tag reader gateway device reduces the complexity of the network by reducing the quantity of tag reader gateway devices used to manage the plurality of tag reader devices in the network, which reduces the quantity of connections to the tag reader platform. Moreover, in this way, the tag reader gateway device determines the validity of a tag identifier, and may not transmit the information associated with a scan of a tag, associated with the tag identifier, to the server if the tag identifier is determined to be invalid, which conserves processing, network, and storage resources that would have otherwise been used to transmit and store the information associated with the scan of the tag.

In addition, the tag reader gateway device may be capable of receiving, from the tag reader device and after determining that the tag identifier is valid, information associated with a plurality of other scans of the tag, determining whether a time duration between a first time associated with the scan of the tag and each of a plurality of second times associated with the plurality of other scans of the tag satisfies a time duration threshold, and determining, based on determining that the time duration satisfies the time duration threshold, to not transmit the information associated with the plurality of other scans of the tag to the server. In this way, the tag reader gateway device conserves processing, network, and storage resources that would have otherwise been used to transmit and store information associated with redundant or duplicative scans of the tag.

FIGS. 1A-1G are diagrams of an example implementation 100 described herein. As shown in FIG. 1A, implementation 100 may include a plurality of tag reader devices (e.g., tag reader device 1 through tag reader device n, collectively referred to as "tag reader devices" and individually as "tag reader device"), a camera device, a tag reader gateway device, a tag reader platform, and/or the like.

In some implementations, the tag reader devices, the camera device, and the tag reader gateway device may be included in a network, such as a local network, a private network, an enterprise network, a campus network, and/or the like. In some implementations, each of the tag reader devices and the camera device may be communicatively connected with the tag reader gateway device. The connection between the tag reader devices and the tag reader gateway device, and between the camera device and the tag reader gateway device, may be a wired and/or wireless connection. For example, the connection between the tag reader devices and the tag reader gateway device, and between the camera device and the tag reader gateway device, may be an Ethernet connection, a Wi-Fi connection, a Bluetooth connection, a Bluetooth Low Energy (BLE) connection, a LoRa connection, a ZigBee connection, and/or implemented by any other type of wired or wireless technology. Moreover, the tag reader devices and the tag reader gateway device may be provisioned and/or updated to support new communications interfaces as they are introduced. In some implementations, the tag reader gateway device may be communicatively connected with the tag reader platform via another network, such as a telecommunications network, a provider network, a mobile network, another local network, and/or the like. In some implementations, the connection between the tag reader devices and the tag reader gateway device, the connection between the tag reader gateway device and the tag reader platform, and/or the like, may be an encrypted using secure sockets layer (SSL) encryption, transport layer security (TLS) encryption, and/or the like.

A tag reader device may include a device configured to scan tags. In some implementations, a tag may be associated with an asset (e.g., an asset tag affixed to a laptop, an asset tag affixed to a display device, etc.) and may be used to track the asset (e.g., to track the location of the asset, to track the service history of the asset, to track the asset during shipping, etc.), and/or the like. In some implementations, a tag may be associated with a user (e.g., an employee badge, a parking pass, etc.) and may be used to provide the user with access to various locations (e.g., to an employer facility, to an apartment complex, etc.), and/or the like. In some implementations, a tag may be an active tag, a passive tag and/or the like. An active tag may be a tag that includes a power source that powers the tag. A passive tag may be a tag that does not include a power source, and is instead powered by a signal transmitted by a tag reader device or another source, or is not powered at all.

In some implementations, each tag reader device, of the tag reader devices, may be configured to read a particular type of tag, which may determine a tag reader type associated with the tag reader device. For example, a tag reader device may be configured to read a barcode type of tag (e.g., a one-dimensional barcode tag, a two-dimensional barcode tag, etc.), and may therefore be associated with a barcode tag reader type. Other types of tags may include a RFID tag, a Bluetooth tag, a Bluetooth Low Energy (BLE) tag, a near-field communication (NFC) tag, a quick response (QR) code type of tag, a RuBee tag, a ZigBee tag, and/or the like, as well as other types of tags. Moreover, the tag reader devices and the tag reader gateway device may be provisioned and/or updated to support new tag types as they are introduced. In some implementations, each tag reader device, of the tag reader devices, may be configured to read a different type of tag. For example, tag reader device 1 may configured to read a barcode tag, tag reader device 2 may be configured to read a BLE tag, tag reader device n may be configured to read a NFC tag, and so on. In some implementations, two or more tag reader devices, of the tag reader devices, may be configured to read the same type of tag whereas other tag reader devices, of the tag reader devices, may be configured to read a different type of tag. For example, tag reader device 1 and tag reader device 2 may be configured to read a RuBee tag whereas tag reader device n may be configured to read a NFC tag.

The camera device may include one or more devices capable of capturing a video, audio, an image, and/or the like, associated with the tag reader devices. In some implementations, the camera device may be included in a tag reader device, may be included in the tag reader gateway device, may be a standalone device, may be included in another device, and/or the like. In some implementations, the camera device may include a plurality of camera devices. Each camera device, of the plurality of camera devices, may be positioned such that one or more of the tag reader devices is located in a field of view of the camera device. In this way, the camera device may monitor the one or more tag reader devices, may record video, audio, and/or images, and/or the like. Accordingly, the camera device may be used to detect and/or record a theft of an asset associated with a tag, an unauthorized access to a location associated with the one or more tag reader devices, and/or the like, which increases the security of the one or more tag reader devices, of one or more tags, of one or more assets associated with the one or more tags, of one or more locations associated with the one or more tag reader devices, and/or the like.

The tag reader gateway device may include a device capable of managing the tag reader devices, capable of processing scans of tags (e.g., for tens, hundreds, thousands, millions, or more scans of tags within a period of time (e.g., per minute, per hour, per day, etc.)), and/or the like. In some implementations, the tag reader gateway device may update a driver installed on a tag reader device, may receive, from a tag reader device, information associated with a scan of a tag, may determine a tag identifier associated with the tag and whether the tag identifier is valid, may transmit the information associated with the scan of the tag, and/or the like.

In some implementations, the tag reader gateway device may include a driver store (e.g., driver store 2), a tag identifier (ID) store (e.g., tag ID store 2), a parser store, and/or the like. In some implementations, driver store 2, tag ID store 2, and/or the parser store may be located remote from, and accessible by, the tag reader gateway device.

Driver store 2 may store tag reader device drivers associated with various tag reader types. For example, driver store 2 may store a driver for a Bluetooth tag reader device, a driver for a barcode tag reader device, and so on. In some implementations, the tag reader gateway device may use driver store 2 to install a driver on a tag reader device. For example, the tag reader gateway device may install a driver on tag reader device 1 by determining a tag reader type associated with tag reader device 1, identifying, in driver store 2, a driver associated with the tag reader type associated with tag reader device 1, and transmitting the driver to tag reader device 1 along with an instruction to install the driver on tag reader device 1. In some implementations, the tag reader gateway device may obtain a driver from the tag reader platform and may store the driver in driver store 2. In this way, the tag reader gateway device may ensure that the drivers stored in driver store 2 are updated by obtaining the latest version of the drivers from the tag reader platform.

Tag ID store 2 may store tag identifiers. In some implementations, the tag reader device gateway may use tag ID store 2 to determine whether a tag identifier associated with a tag that has been scanned is valid. In some implementations, the tag reader gateway device may synchronize with a tag ID store on the tag reader platform (e.g., tag ID store 1). In this way, new tag identifiers may be added to tag ID store 2, tag identifiers stored in tag ID store 2 may be removed, and/or the like.

The parser store may store a plurality of parsers. Each parser, of the plurality of parsers stored in the parser store, may be associated with a particular tag reader type. For example, the parser store may store a first parser associated with a barcode tag reader type, a second parser associated with a NFC tag reader type, and so on. A parser associated with a particular tag reader type may include an element (e.g., an extensible markup language (XML) electronic file parser, a JavaScript object notation (JSON) electronic file parser, etc.) that is configured with one or more parameters to parse information associated with a scan of a tag to identify a tag identifier. The one or more parameters may include a parameter specifying that the parser is to identify a string of alphanumeric characters of a particular length, a parameter specifying that the parser is to identify a string of alphanumeric characters starting with one or more particular characters, a parameter specifying that the parser is to identify a string of alphanumeric characters ending with one or more particular characters, and/or the like. As an example, a parser associated with a RFID tag reader type may be configured to parse information associated with a scan of a RFID tag to identify a tag identifier that starts with the character "E" and is 28 characters in length. The preceding is an example only, and other lengths, start characters, character sequences, and/or other parameters of the tag identifier may be used and may vary based on vendor, network operator, administrator, and/or the like.

In some implementations, the tag reader gateway device may update a parser, of the plurality of parsers, stored in the parser store. In this way, the tag reader gateway device may improve the efficiency and/or functionality of the parser. In some implementations, the tag reader gateway device may add a new parser to the parser store. In this way, the tag reader gateway device may support new tag reader types, which improves the operation of the tag reader gateway device.

The tag reader platform may be a server device, a cloud-based platform, and/or the like, that is capable of storing information associated with a scan of a tag, providing a driver to the tag reader gateway device, providing tag identifiers to the tag reader gateway device, and/or the like. In some implementations, the tag reader platform may include a driver store (e.g., driver store 1) that may store drivers associated with the tag reader devices, a tag ID store (e.g., tag ID store 1) that may store tag identifiers, a tag scan store that may store information, associated with a scan of a tag, received from the tag reader gateway device, and/or the like. In some implementations, driver store 1, tag ID store 1, and/or the tag scan store may be located remote from, and accessible by, the tag reader platform and/or the tag reader gateway device.

Figure 1B:
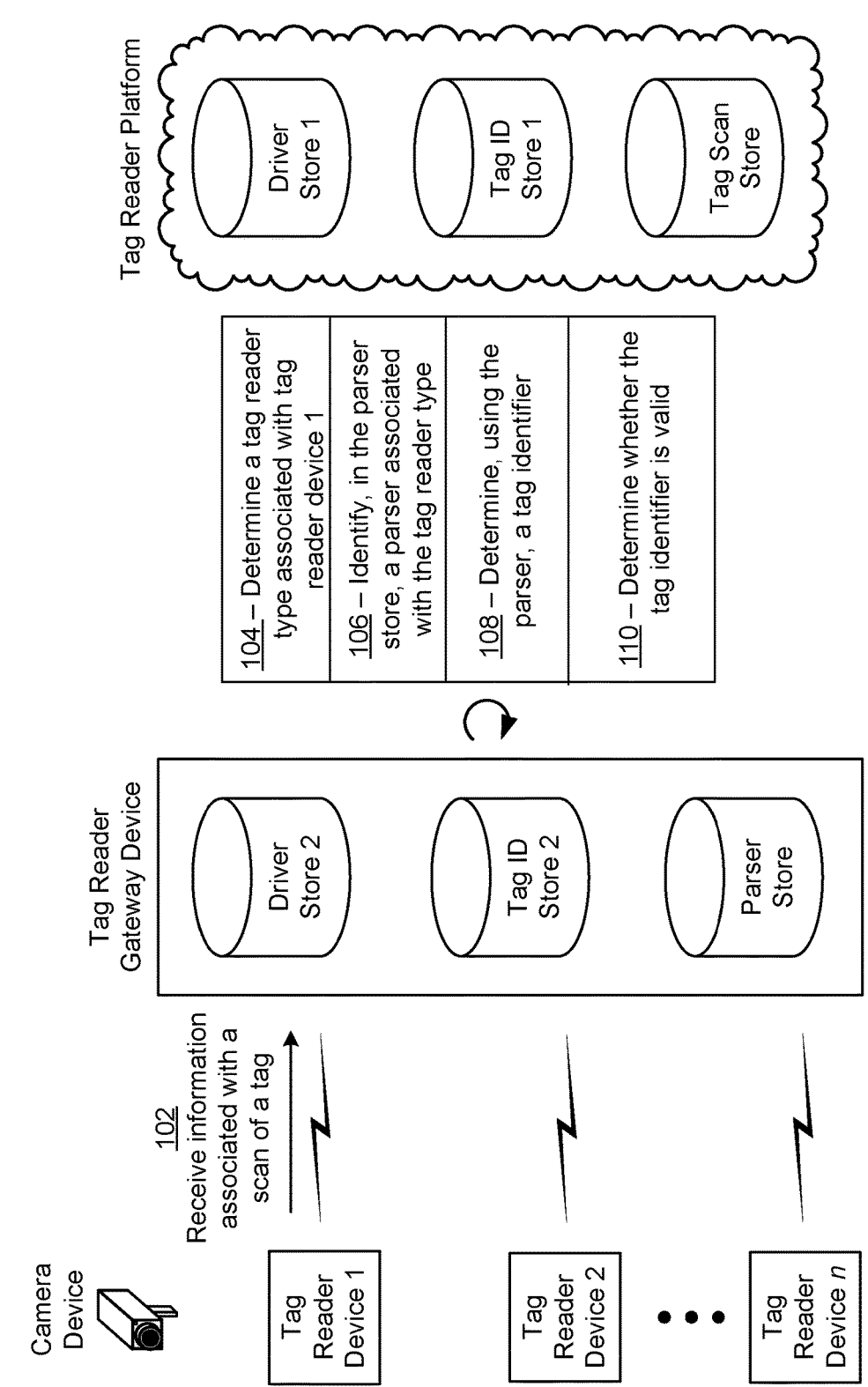

Turning to FIG. 1B, in some implementations, a tag reader device (e.g., tag reader device 1) may scan a tag. For example, tag reader device 1 may be a RFID badge reader that is located in an office building of an enterprise and is used to provide access to a lab in the office building. An employee of the enterprise may seek to access the lab and may therefore place a tag (e.g., employee's RFID employee badge) near tag reader device 1. As a result, tag reader device 1 may scan the tag to obtain information represented by the tag, which may include a tag identifier associated with the tag, and/or other information associated with the tag.

As shown by reference number 102, tag reader device 1 may transmit, to the tag reader gateway device and based on scanning the tag, information associated with the scan of the tag. In some implementations, the information associated with the scan of the tag may include information identifying a tag reader type associated with tag reader device 1, information identifying a location of tag reader device 1, the information represented by the tag, information identifying a time and/or date of the scan, and/or the like. The tag reader device 1 may transmit the information associated with the scan of the tag to the tag reader gateway device in an electronic file, such as an XML, file, a JSON file, another type of structured electronic file, and/or the like.

In some implementations, tag reader device 1 may transmit the information associated with the scan of the tag based on a signal strength measurement associated with the scan satisfying a signal strength threshold. For example, the tag may be an active tag, such as a BLE tag, a ZigBee tag, and/or the like, and tag reader device 1 may scan the tag by transmitting an interrogation signal to the tag. The tag may respond to the interrogation signal by transmitting, to tag reader device 1, the information represented by the tag. Tag reader device 1 may measure the signal strength of the transmission from the tag to tag reader device 1 and may determine whether the measurement satisfies the signal strength threshold. In this way, tag reader device 1 may use the signal strength measurement as an indicator of distance between tag reader device 1 and the tag. Accordingly, tag reader device 1 may use the signal strength measurement to ensure that the information associated with the scan of the tag is transmitted to the tag reader gateway device when the tag is within a particular distance to the tag reader device 1, which reduces inadvertent scans of the tag and/or other tags in the vicinity of tag reader device 1, which increases the quality of scans of the tag (e.g., by ensuring that the tag is scanned when a signal strength associated with the scan is strong), increases security of tag reader device 1 (e.g., by prevent an inadvertent scan of the tag granting an unauthorized user with access to the location associated with tag reader device 1, and/or the like.

In some implementations, tag reader device 1 may encrypt the information associated with the scan of the tag prior to transmitting the information associated with the scan of the tag to the tag reader gateway device to provide additional security. For example, tag reader device 1 may encrypt the information associated with the scan of the tag using an advanced encryption standard (AES) based encryption (e.g., AES-128, AES-192, AES-256, etc.), using a data encryption standard (DES) based encryption (e.g., Triple DES, generalized DES, DES-X, etc.), and/or the like.

The tag reader gateway device may receive, from tag reader device 1, the information associated with the scan of the tag. In some implementations, if tag reader device 1 encrypted the information associated with the scan of the tag, tag reader gateway device may decrypt the information associated with the scan of the tag based on receiving the information associated with the scan of the tag.

As shown by reference number 104, the tag reader gateway device may determine a tag reader type associated with tag reader device 1. In some implementations, the tag reader gateway device may determine the tag reader type associated with tag reader device 1 based on the information, included in the information associated with the scan of the tag, identifying the tag reader type associated with tag reader device 1. For example, the information associated with the scan of the tag may include a tag reader type field, and the tag reader type field may include the information identifying the tag reader type associated with tag reader device 1. The tag reader type field may include a bit string, an alphanumeric character string, and/or the like, that identifies the tag reader type associated with tag reader device 1. As an example, the tag reader type field may include an alphanumeric string "0001", which may indicate a RFID tag reader type, may include an alphanumeric string "0002", which may indicate a BLE tag reader type, and/or the like.

As shown by reference number 106, the tag reader gateway device may identify, in the parser store, a parser associated with the tag reader type that is associated with tag reader device 1. As explained above, each parser, of the plurality of parsers, stored in the parser store may be associated with a particular tag reader type. The parser store may include information that associates each parser, of the plurality of parsers, with a particular tag reader type. For example, the parser store may store information that associates alphanumeric string "0001" with a parser associated with a RFID tag reader type, may store information that associates alphanumeric string "0002" with a parser associated with a BLE tag reader type, and so on. Accordingly, the tag reader gateway device may identify the parser associated with the tag reader type that is associated with tag reader device 1 by identifying the information, included in the information associated with the scan of the tag, identifying the tag reader type, and identifying the parser based on the information, stored in the parser store, that associates the parser with the tag reader type. In some implementations, the information that associates each parser with a particular tag reader type may be included in metadata, an XML electronic file, a JSON electronic file, another type of structure data format, and/or the like.

As shown by reference number 108, the tag reader gateway device may determine, using the parser associated with the tag reader type, a tag identifier identified in the information associated with the scan of the tag. In some implementations, the information associated with the scan of the tag may include a field that includes the information represented by the tag. The tag reader gateway device may use the parser associated with the tag reader type to parse the field that includes the information represented by the tag to determine the tag identifier associated with the tag. For example, the parser may parse, based on being configured with one or more parameters to parse the information associated with a scan of a tag to identify the tag identifier as described above, the field that includes the information represented by the tag to determine the tag identifier associated with the tag.

As shown by reference number 110, the tag reader gateway device may determine whether the tag identifier, determined from the information associated with the scan of the tag, is valid. In some implementations, a tag identifier may be valid or not valid based on whether an asset associated with a tag that is associated with the tag identifier is managed by an organization or enterprise associated with a tag reader device. For example, a tag reader device associated with a first organization may determine that a tag identifier, associated with a tag that is associated with an asset managed by a second organization, is invalid because the asset is not managed by the first organization. In some implementations, a tag identifier may be valid or not valid based on whether the tag (or user) associated with the tag identifier is authorized to access an asset, a location, and/or the like, associated with tag reader device 1. For example, a user may be authorized to access a first office building and may not authorized to access a second office building. Accordingly, a tag identifier associated with a tag of the user may be valid when the tag is scanned by a tag reader device associated with the first office building, and may be not valid when the tag is scanned by a tag reader device associated with the second office building.

In some implementations, the tag reader gateway device may determine whether the tag identifier is valid based on whether tag ID store 2 includes information identifying the tag identifier. For example, the tag reader gateway device may determine that the tag identifier is valid if tag ID store 2 includes information identifying the tag identifier, and/or may determine that the tag identifier is not valid if tag ID store 2 does not include information identifying the tag identifier. In some implementations, the tag reader gateway device may determine whether the tag identifier is valid based on whether tag ID store 2 includes information identifying the tag identifier. For example, the tag reader gateway device may determine that the tag identifier is valid if tag ID store 2 includes information identifying the tag identifier, and/or may determine that the tag identifier is not valid if tag ID store 2 does not include information identifying the tag identifier.

In some implementations, the tag reader gateway device may determine whether the tag identifier is valid based on whether tag ID store 2 includes information that identifies the tag identifier as valid and/or invalid. For example, tag ID store 2 may include information identifying the tag identifier, and may include a field, metadata, and/or the like, associated with the tag identifier that indicates whether the tag identifier is valid and/or invalid.

In some implementations, the tag reader gateway device may determine whether the tag identifier is valid based on a location of tag reader device 1. For example, tag ID store 2 may include information identifying one or more locations that the tag identifier (and thus the tag and/or user associated with the tag) is authorized to access. The tag reader gateway device may identify a location of tag reader device 1 based on the information associated with the scan of the tag (e.g., by identifying information identifying the location of tag reader device 1 in a location field of the information identifying the location of tag reader device 1), and may determine whether the tag identifier is valid and/or invalid based on the information identifying the one or more locations that the tag identifier is authorized to access. Accordingly, the tag reader gateway device may determine that the tag identifier is valid if the tag identifier is authorized to access the location associated with tag reader device 1, and may determine that the tag identifier is not valid if the tag identifier is not authorized to access the location associated with tag reader device 1.

Figure 1C:
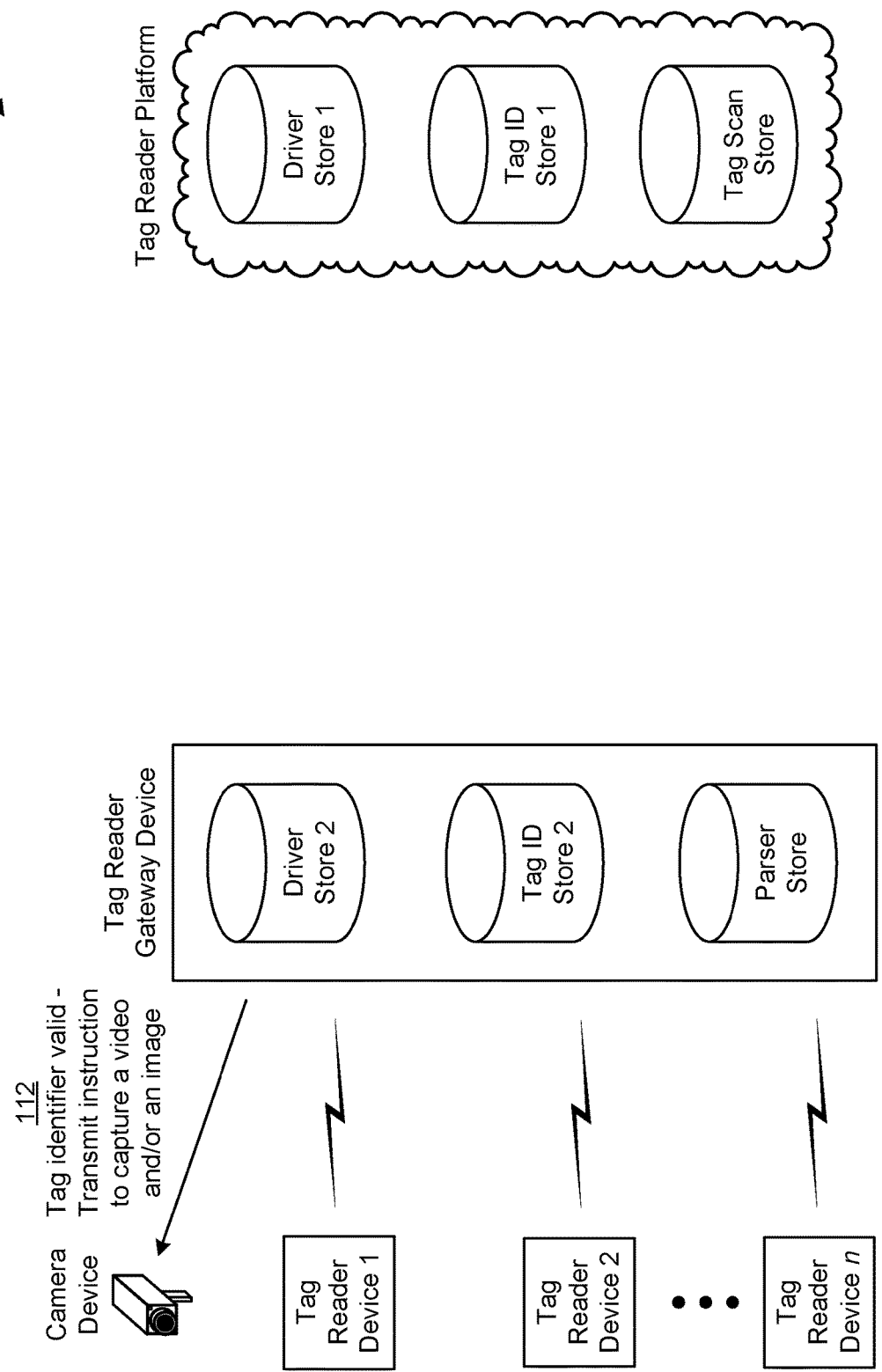

Turning to FIG. 1C, and as shown by reference number 112, the tag reader gateway device may transmit an instruction to the camera device to capture a video, an image, audio and/or the like, based on determining that the tag identifier is valid. The camera device may receive the instruction, and may capture the video, the image, the audio, and/or the like, based on receiving the instruction. In some implementations, the camera device may capture a live video and/or audio feed, may record a video and/or audio of a particular length (e.g., 30 seconds, one minute, etc.), may capture a particular quantity of images (e.g., one image, five images, etc.), may record a video and/or audio until an event occurs (e.g., may capture a video until the camera device no longer detects movement within the field of view of the camera), and/or the like.

Turning to FIG. 1D, and as shown by reference number 114, the camera device may transmit an electronic file to the tag reader gateway device based on capturing the video, the image, the audio, and/or the like. The electronic file may include the video recording, the audio recording, the one or more images, and/or the like. As shown by reference number 116, the tag reader gateway device may receive the electronic file and may transmit the information associated with the scan of the tag, along with the electronic file, to the tag reader platform. The information associated with the scan of the tag may include the information identifying the tag identifier associated with the tag, the information identifying the location of tag reader device 1, the information identifying the time and/or the date of the scan, and/or the like. In some implementations, the tag reader gateway device may encrypt the information associated with the scan of the tag and/or the electronic file prior to transmitting the information associated with the scan of the tag and the electronic file to the tag reader platform.

The tag reader platform may receive the information associated with the scan of the tag and the electronic file, may decrypt the information associated with the scan of the tag and/or the electronic file if encrypted, and may store the information associated with the scan of the tag and the electronic file in the tag scan store. The tag reader platform may use the information associated with the scan of the tag and the electronic file to maintain a status of the asset associated with the tag, to generate an analysis report, may generate a notification associated with the scan of the tag and may transmit the notification to another device (e.g., a user device), may push the information associated with the scan of the tag and the electronic file to another device (e.g., a user device), and/or the like.

Figure 1E:
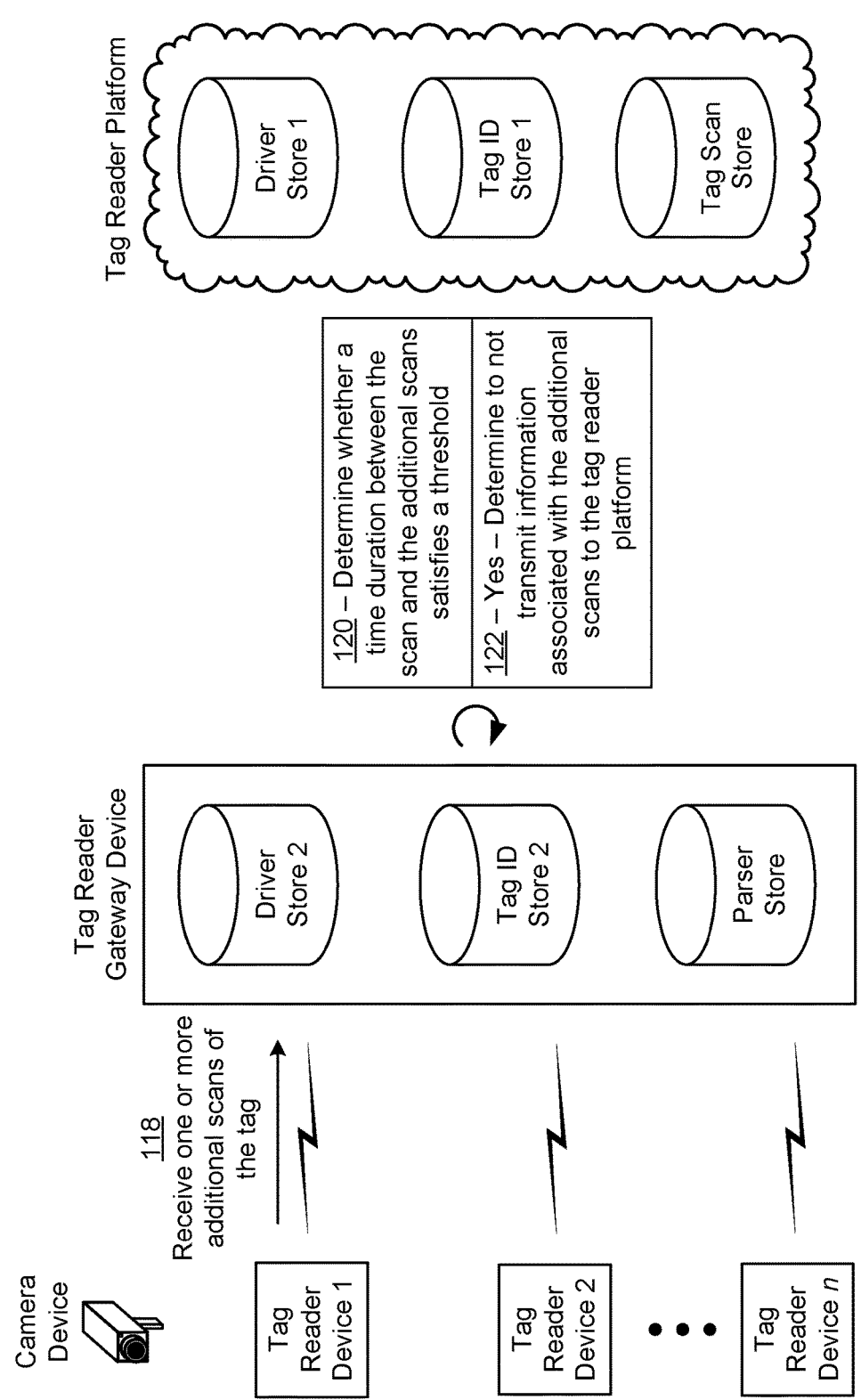

Turning to FIG. 1E, and as shown by reference number 118, the tag reader gateway device may receive, from tag reader device 1, one or more additional scans of the tag. As shown by reference number 120, the tag reader gateway device may determine whether a time duration between a time associated with the scan of the tag, and a time associated with each of the one or more scans of the tag, satisfies a time duration threshold. The time duration threshold may be, for example, three seconds, five seconds, and/or the like, and may be specified to prevent information associated with the one or more additional scans of the tag from being transmitted to the tag reader platform because the one or more additional scans of the tag may be redundant and/or inadvertent. For example, a user may place the tag near tag reader device 1 so that tag reader device 1 performs a first scan of the tag, and may inadvertently, accidently, or purposefully place the tag near tag reader device 1 so that tag reader device 1 performs a second scan of the tag one second later. The time duration threshold ensures that information associated with the first scan of the tag is transmitted to the tag reader platform and that information associated with the second scan of the tag is not transmitted to the tag reader platform, which conserves processing, memory, and network resources that would have otherwise been used to transmit information associated with a redundant, inadvertent, and/or accidental scan of the tag.

As shown by reference number 122, the tag reader gateway device may determine that the time duration between the scan of the tag, and the time associated with each of the one or more additional scans of the tag, satisfies the time duration threshold. Accordingly, the tag reader gateway device may determine to not transmit the information associated with the one or more additional scans of the tag to the tag reader platform.

Figure 1F:
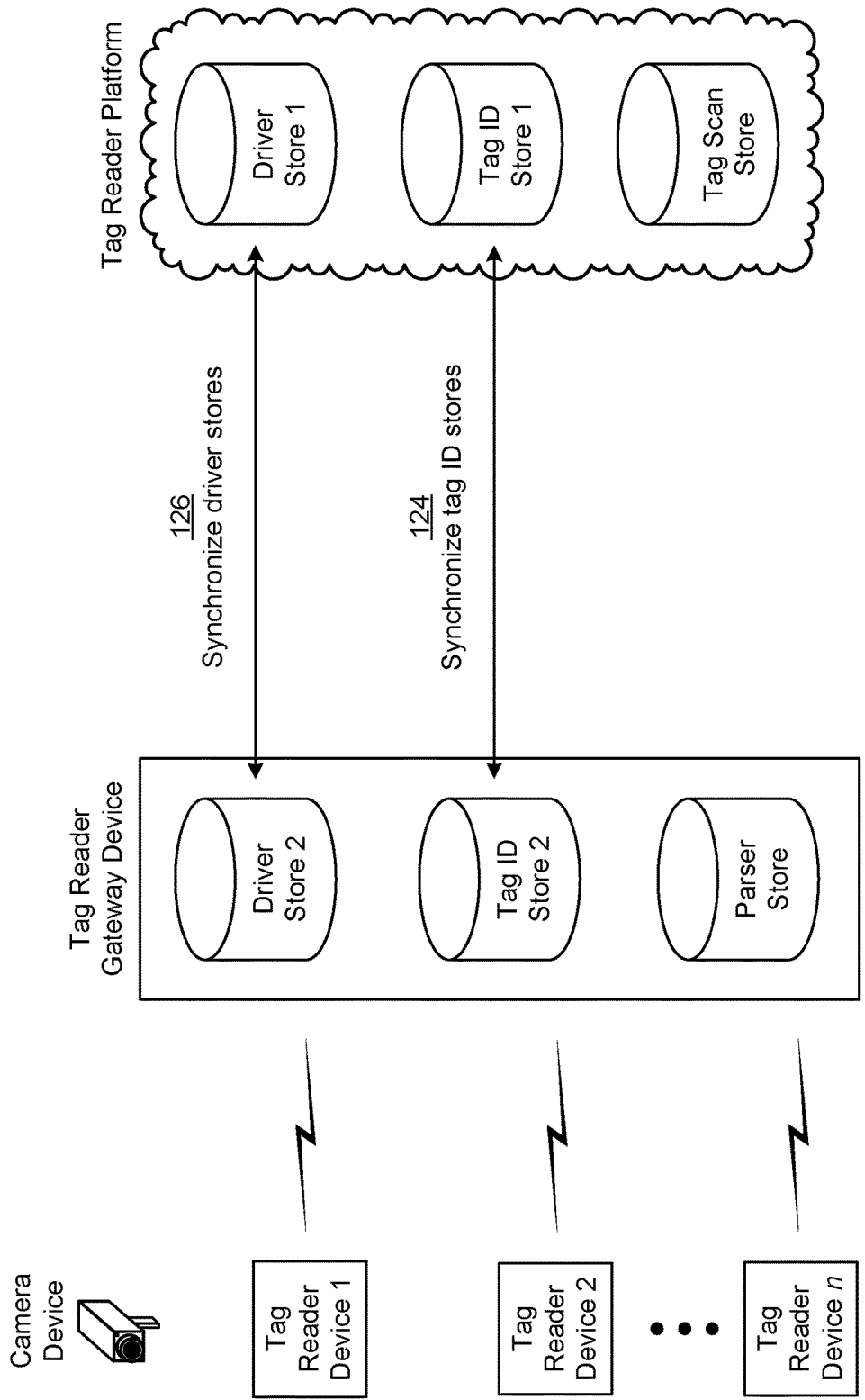

Turning now to FIG. 1F, in some implementations, the tag reader gateway device may ensure that the various stores included in the tag reader gateway device are up-to-date and synchronized with the various stores included in the tag reader platform. As shown by reference number 124, the tag reader gateway device may ensure that tag ID store 2 is up-to-date by synchronizing tag ID store 2 and tag ID store 1 included in the tag reader platform. In this way, the tag reader gateway device ensures that new tag identifiers are added to tag ID store 2 so that the new tag identifiers may be validated, ensures that tag identifiers are removed from tag ID store 2 so that the tag reader gateway device no longer validates the removed tag identifiers, and/or the like.

In some implementations, the tag reader gateway device may synchronize tag ID store 2 and tag ID store 1 by periodically determining whether tag ID store 1 is storing a tag identifier that is not stored in tag ID store 2, to determine whether tag ID store 2 is storing a tag identifier that is not stored in tag ID store 1, and/or the like. In this way, the tag reader platform handles the onboarding and off-boarding process of tag identifiers, and the tag reader gateway device synchronizes with the tag reader platform. Accordingly, if the tag reader gateway device determines that tag ID store 1 is storing a tag identifier that is not stored in tag ID store 2, the tag reader gateway device may obtain the tag identifier from tag ID store 1 and store the tag identifier in tag ID store 2. Moreover, if the tag reader gateway device determines that tag ID store 2 is storing a tag identifier that is not stored in tag ID store 1, the tag reader gateway device may remove the tag identifier from tag ID store 2.

In some implementations, the tag reader gateway device may synchronize tag ID store 2 and tag ID store 1 based on receiving an instruction from the tag reader platform. For example, the tag reader gateway device may receive an instruction to store a new tag identifier in tag ID store 2, may obtain the new tag identifier from tag ID store 1, and may store the new tag identifier in tag ID store 2 based on receiving the instruction. As another example, the tag reader gateway device may receive an instruction to remove a tag identifier from tag ID store 2, and may remove the tag identifier from tag ID store 2 based on receiving the instruction.

As shown by reference number 126, the tag reader gateway device may ensure that driver store 2 is up-to-date by synchronizing driver store 2 and driver store 1 included in the tag reader platform. In this way, the tag reader gateway device ensures that new drivers for the tag reader devices are added to tag ID store 2 so that the tag reader gateway device may ensure the tag reader devices are using the most up-to-date versions of the drivers.

In some implementations, the tag reader gateway device may synchronize driver store 2 and driver store 1 by periodically determining whether driver store 1 is storing a newer or updated version of a driver stored in driver store 2. For example, the tag reader gateway device may determine a version of the driver stored in driver store 2, may compare the version of the driver stored in driver store 2 with a version of the driver stored in driver store 1, and may determine that the version of the driver stored in driver store 1 is an updated version of the driver stored in driver store 2 based on the comparison. Accordingly, the tag reader gateway device may obtain the updated version of the driver from driver store 1, and may store the updated version of the driver in driver store 2. In some implementations, the tag reader gateway device may synchronize driver store 2 and driver store 1 based on receiving an instruction from the tag reader platform. For example, the tag reader gateway device may receive an instruction to store an updated version of a driver stored in driver store 2, may obtain the updated version of the driver from driver store 1, and may store the updated version of the driver in driver store 2 based on receiving the instruction.

Turning to FIG. 1G, the tag reader gateway device may ensure that the tag reader devices are using the latest and/or most up-to-date drivers. As shown by reference number 128, the tag reader gateway device may periodically determine a version of a driver associated with a tag reader device (e.g., a version of a driver installed on tag reader device 2). In some implementations, the tag reader gateway device may determine the version of the driver installed on tag reader device 2 based on requesting information, from tag reader device 2, indicating the version of the driver installed on tag reader device 2, based on receiving the information indicating the version of the driver installed on tag reader device 2 when the connection between tag reader device 2 and the tag reader gateway device is established, and/or the like.

The tag reader gateway device may determine a version of the driver, associated with tag reader device 2, that is stored in driver store 2. As shown by reference number 130, the tag reader gateway device may determine whether the version of the driver, associated with tag reader device 2, that is stored in driver store 2 is an updated version of the driver, associated with tag reader device 2, that is installed on tag reader device 2.

As shown by reference number 132, based on determining that the version of the driver, associated with tag reader device 2, that is stored in driver store 2 is the updated version of the driver, associated with tag reader device 2, that is installed on tag reader device 2, the tag reader gateway device may transmit the updated version of the driver to tag reader device 2. The tag reader gateway device may also transmit, to tag reader device 2, an instruction to install the updated version of the driver on tag reader device 2. Tag reader device 2 may receive the updated version of the driver and may install the updated version of the driver on tag reader device 2 based on receiving in the instruction. In this way, the tag reader gateway device ensures that tag reader device 2 is using the latest and/or most up-to-date version of the driver associated with tag reader device 2, which increases the efficiency of tag reader device 2.

As indicated above, FIGS. 1A-1G are provided merely as an example. Other examples are possible and may differ from what was described with regard to FIGS. 1A-1G.

Figure 2:
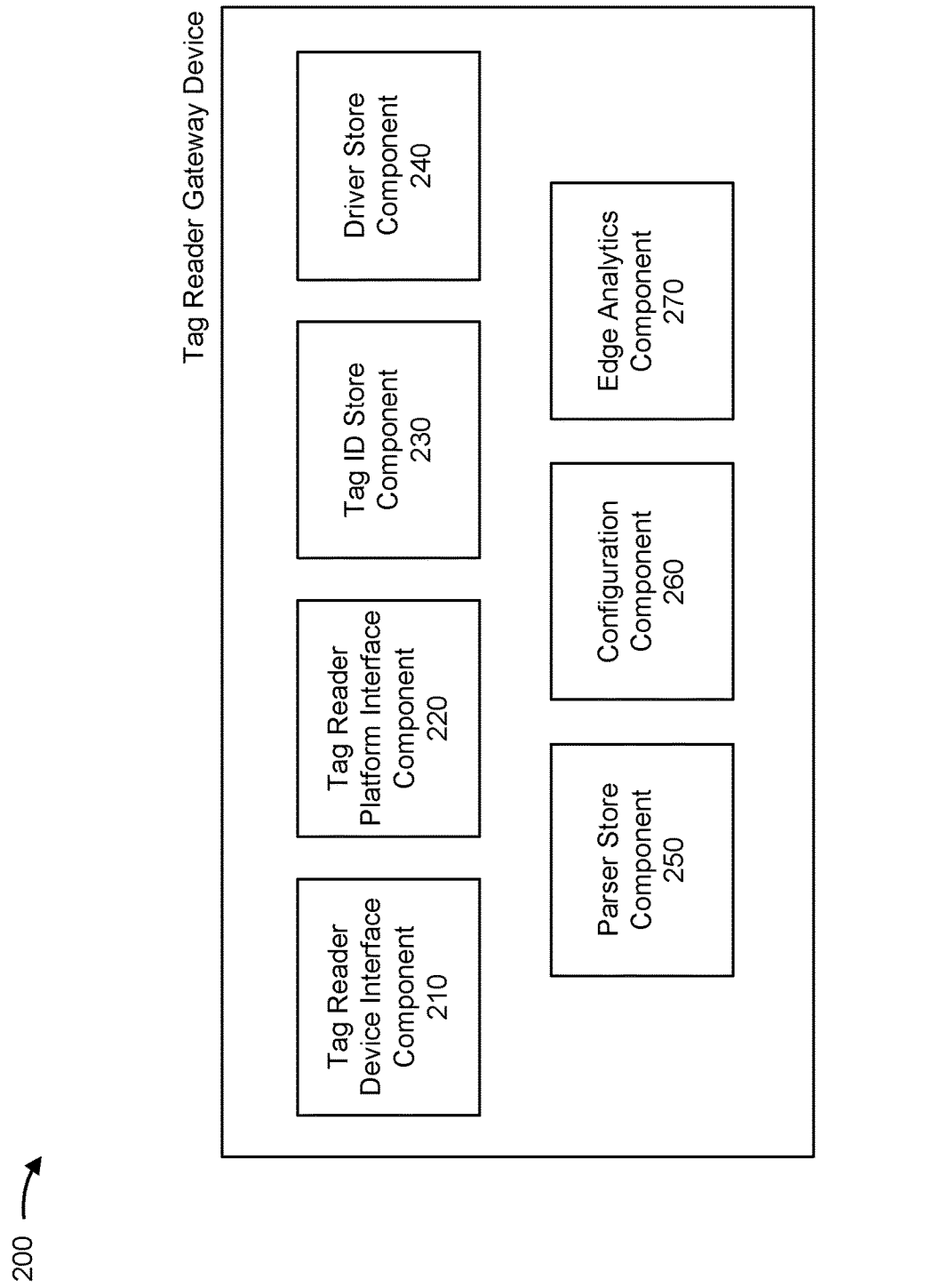
FIG. 2 is a diagram of an example tag reader gateway device in which functions and/or components described herein may be implemented.

FIG. 2 is a diagram of an example tag reader gateway device 200, in which functions and/or components described herein may be implemented. As shown in FIG. 2, tag reader gateway device 200 may include various components, such as a tag reader device interface component 210, a tag reader platform interface component 220, a tag ID store component 230, a driver store component 240, a parser store component 250, a configuration component 260, an edge analytics component 270, and/or the like. In some implementations, tag reader gateway device 200 may be included in a network with a plurality of tag reader devices, and may manage the plurality of tag reader devices. In some implementations, tag reader gateway device may be communicatively connected with a tag reader platform.

Tag reader device interface component 210 may include a communications interface (e.g., a wired communications interface, a wireless communications interface, etc.) that enables tag reader gateway device 200 to receive, from a tag reader device, information associated with a scan of a tag, to transmit, to the tag reader device, a driver and an instruction to install the driver on the tag reader device, and/or the like. In some implementations, tag reader device interface component 210 may communicate with a tag reader interface component associated with the tag reader device. In some implementations, tag reader device interface component 210 and the tag reader interface component associated with the tag reader device may operate in a master/slave architecture, where tag reader device interface component 210 is the master and the tag reader interface component associated with the tag reader device (as well as tag reader interface components associated with other tag reader devices in the network) is the slave. For example, tag reader device interface component 210 may be a Bluetooth master and the tag reader interface component associated with the tag reader device may be a Bluetooth slave.

Tag reader platform interface component 220 may include a communications interface (e.g., a wired communications interface, a wireless communications interface, etc.) that enables tag reader gateway device 200 to receive, from a tag reader platform, drivers, tag identifiers, and/or the like, and to transmit, to the tag reader platform, information associated with a scan of a tag, an electronic file including a video recording, audio recording, one or more images, and/or the like.

Tag ID store component 230 may store information identifying a plurality of tag identifiers. For example, each tag identifier, of the plurality of tag identifiers, may be associated with a particular tag. Driver store component 240 may store a plurality of drivers associated with a plurality of tag reader types. For example, each driver, of the plurality of drivers, may be associated with a particular tag reader type, of the plurality of tag reader types, as explained above in reference to FIGS. 1A-1G. Parser store component 250 may store a plurality of parsers associated with the plurality of tag reader types. For example, each parser, of the plurality of parsers, may be associated with a particular tag reader type, of the plurality of tag reader types, as explained above in reference to FIGS. 1A-1G.

In some implementations, each of tag ID store component 230, driver store component 240, and parser store component 250 may include a data structure, such as a database, a file system, a storage device (e.g., a memory device, a storage drive, etc.), an electronic file, and/or the like. In some implementations, tag ID store component 230, driver store component 240, and/or parser store component 250 may be included in the same data structure, in separate data structures, and/or the like. In some implementations, tag ID store component 230, driver store component 240, and/or parser store component 250 may be located remote from, and accessible by, tag reader gateway device 200.

Configuration component 260 may manage the configuration of the plurality of tag reader devices, may manage tag ID store component 230, driver store component 240, and parser store component 250, and/or the like. For example, to manage the configuration of a tag reader device, configuration component 260 may provide the tag reader device with an updated version of a driver associated with the tag reader device along with an instruction to install the updated version of the driver on the tag reader device, as described above in reference to FIGS. 1A-1G. As another example, to manage tag ID store component 230, configuration component 260 may synchronize tag ID store component 230 and another tag ID store component associated with the tag reader platform, as described above in reference to FIGS. 1A-1G. As another example, to manage driver store component 240, configuration component 260 may synchronize driver store component 240 with a driver store component associated with the tag reader platform, as described above in reference to FIGS. 1A-1G. As another example, to manage parser store component 250, configuration component 260 may update a parser stored in parser store component 250, may store new parsers in parser store component 250 so that edge analytics component 270 may support new types of tag reader types, and/or the like, as described above in reference to FIGS. 1A-1G.

Edge analytics component 270 may analyze information associated with scans of tags, may analyze electronic files received from a camera device, and/or the like. For example, edge analysis component 270 may analyze information, associated with a scan of a tag, received from a tag reader device by identifying a tag identifier based on the information, by determining whether the tag identifier is valid, and/or the like, as described above in reference to FIGS. 1A-1G. Moreover, edge analytics component 270 may provide an instruction to a camera device to capture a video, an image, audio, and/or the like, may analyze an electronic file, including a video recording, an audio record, an image, and/or the like, received from the camera device, and/or the like. For example, edge analytics component 270 may analyze an electronic file including a video recording to detect a face in the video recording, detect an object (e.g., a license plate number), and/or the like using one or more object recognition techniques.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components of tag reader gateway device 200 may perform one or more functions described as being performed by another set of components of tag reader gateway device 200.

Figure 3:
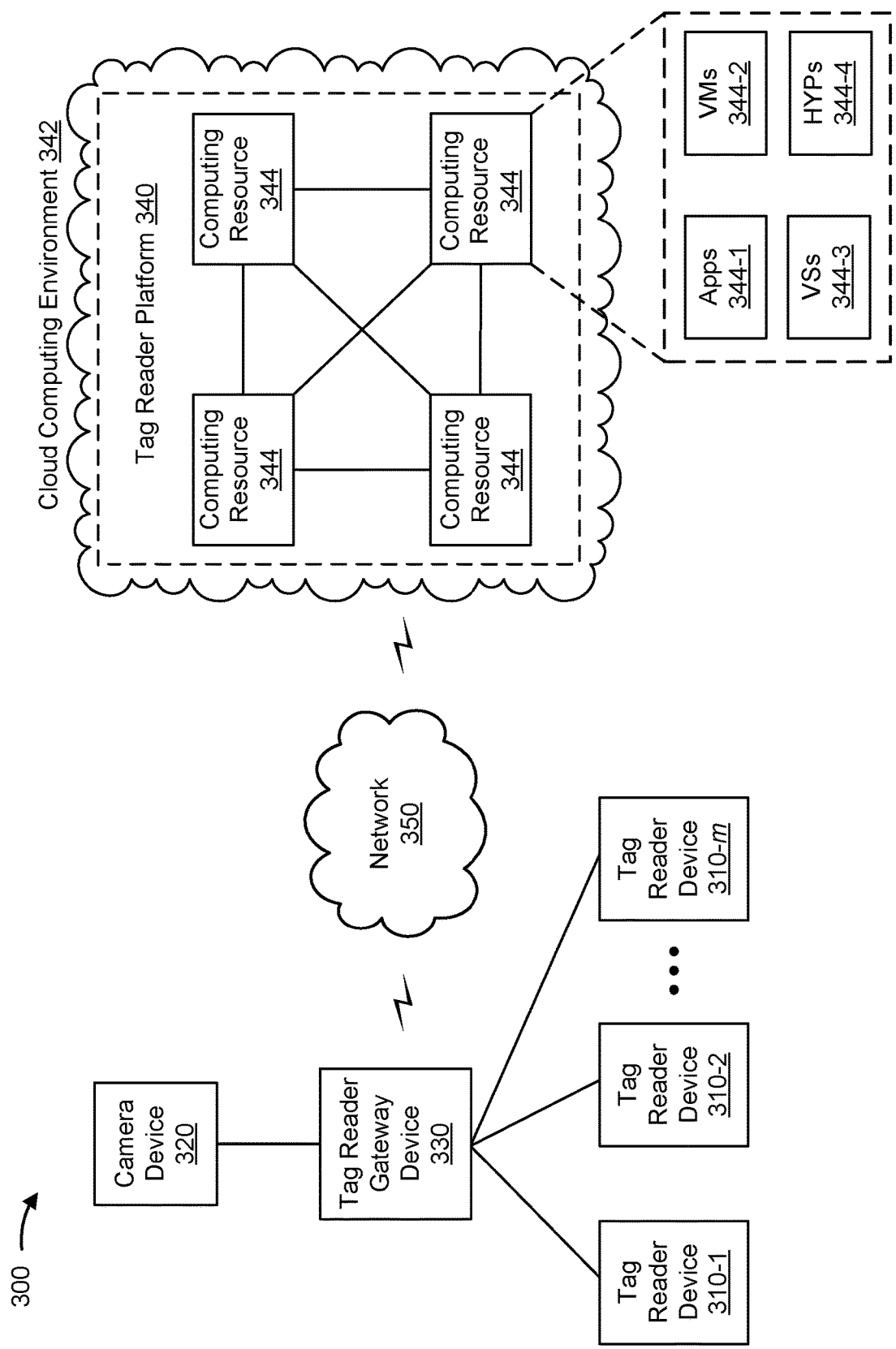
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a plurality of tag reader devices (e.g., tag reader device 310-1 through tag reader device 310-m, collectively referred to as "tag reader devices 310", and individually referred to as "tag reader device 310"), a camera device 320, a tag reader gateway device 330, a tag reader platform 340 in a cloud computing environment 342 that includes a set of computing resources 344, and a network 350. Devices of environment 300 may interconnect via wired connections, wireless connections, or a combination of wired and wireless connections.

Tag reader device 310 includes one or more devices capable of receiving, generating, storing, processing, and/or providing data associated with a scan of a tag. For example, tag reader device 310 may include a mobile device (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, a scanning tool, or a similar type of device. As another example, tag reader device 310 may include a barcode tag reader (e.g., a one-dimensional barcode reader, a two-dimensional barcode reader, etc.), a Bluetooth tag reader, a Bluetooth Low Energy tag reader, a RFID tag reader, a QR code tag reader, a RuBee tag reader, a NFC tag reader, and/or the like.

In some implementations, tag reader device 310 may scan a tag and may transmit, to tag reader gateway device 330, information associated with the scan of the tag. In some implementations, tag reader device 310 may perform one or more additional scans of a tag and may transmit, to tag reader gateway device 330, information associated with the additional scans of the tag. In some implementations, tag reader device 310 may receive, from tag reader gateway device 330, an updated driver and/or an instruction to install the updated driver.

Camera device 320 includes one or more devices capable of receiving, generating, storing, processing, and/or providing data associated with a video capture, an image capture, a live video stream, and/or the like. For example, camera device 320 may include a mobile device, an IP camera, a wireless camera, and/or the like. In some implementations, camera device 320 may receive an instruction from tag reader gateway device 330, and may capture video, an image, audio, and/or the like, based on receiving the instruction. In some implementations, camera device 320 may transmit an electronic file to tag reader gateway device 330 based on capturing video, an image, audio, and/or the like.

Tag reader gateway device 330 includes one or more devices capable of receiving, generating, storing, processing, and/or providing data associated with managing a plurality of tag reader devices (e.g., tag reader devices 310). For example, tag reader gateway device 330 may include a router, a switch, a gateway, a firewall, a hub, and/or the like. In some implementations, tag reader gateway device 330 may correspond to tag reader gateway device 200, and/or vice-versa.

In some implementations, tag reader gateway device 330 may receive, from tag reader device 310, information associated with a scan of the tag. In some implementations, tag reader gateway device 330 may determine a tag reader type associated with a tag reader device 310, may identify a parser associated with the tag reader type and use the parser to determine a tag identifier, and may determine whether the tag identifier is valid. In some implementations, tag reader gateway device 330 may transmit, to camera device 320, an instruction to capture a video, an image, and/or audio. In some implementations, tag reader gateway device 330 may receive, from camera device 320, an electronic file that may include video, an image, and/or audio. In some implementations, tag reader gateway device 330 may transmit information associated with a scan of a tag, and the electronic file, to tag reader platform 340. In some implementations, tag reader gateway device 330 may receive one or more additional scans of the tag, may determine whether a time duration between the scan and the additional scans satisfies a threshold, and may determine not to transmit information associated with the additional scans to tag reader platform 340. In some implementations, tag reader gateway device 330 may determine a version of a driver associated with a tag reader device 310, and may determine whether a driver store includes an updated version of the driver.

Tag reader platform 340 includes one or more devices capable of receiving, generating, storing, processing, and/or providing data associated with a scan of a tag. For example, tag reader platform 340 may include a server device (e.g., a host server, a web server, an application server, etc.), a data center device, or a similar device. Tag reader platform 340 may receive, from tag reader gateway device 330, information associated with the scan of a tag by tag reader device 310, and information associated with an electronic file received by tag reader gateway device 330 from camera device 320. In some implementations, tag reader platform 340 may synchronize a tag ID store included in tag reader gateway device 330 and a tag ID store included in tag reader platform 340. In some implementations, tag reader platform 340 may synchronize a driver store included in tag reader gateway device 330 and a driver store included in tag reader platform 340.

In some implementations, as shown, tag reader platform 340 may be hosted in cloud computing environment 342. Notably, while implementations described herein describe tag reader platform 340 as being hosted in cloud computing environment 342, in some implementations, tag reader platform 340 may not be cloud-based (i.e., may be implemented outside of a cloud computing environment) or may be partially cloud-based.

Cloud computing environment 342 includes an environment that hosts tag reader platform 340. Cloud computing environment 342 may provide computation, software, data access, storage, and/or other services. As shown, cloud computing environment 342 may include a group of computing resources 344 (referred to collectively as "computing resources 344" and individually as "computing resource 344").

Computing resource 344 includes one or more personal computers, workstation computers, server devices, or another type of computation and/or communication device. In some implementations, computing resource 344 may host tag reader platform 340. The cloud resources may include compute instances executing in computing resource 344, storage devices provided in computing resource 344, data transfer devices provided by computing resource 344, etc. In some implementations, computing resource 344 may communicate with other computing resources 344 via wired connections, wireless connections, or a combination of wired and wireless connections.

As further shown in FIG. 3, computing resource 344 may include a group of cloud resources, such as one or more applications ("APPs") 344-1, one or more virtual machines ("VMs") 344-2, one or more virtualized storages ("VSs") 344-3, or one or more hypervisors ("HYPs") 344-4.

Application 344-1 includes one or more software applications that may be provided to or accessed by one or more devices of environment 300. Application 344-1 may eliminate a need to install and execute the software applications on devices of environment 300. For example, application 344-1 may include software associated with tag reader platform 340 and/or any other software capable of being provided via cloud computing environment 342. In some implementations, one application 344-1 may send/receive information to/from one or more other applications 344-1, via virtual machine 344-2. In some implementations, application 344-1 may include a software application associated with one or more databases and/or operating systems. For example, application 344-1 may include an enterprise application, a functional application, an analytics application, and/or the like.

Virtual machine 344-2 includes a software implementation of a machine (e.g., a computer) that executes programs like a physical machine. Virtual machine 344-2 may be either a system virtual machine or a process virtual machine, depending upon use and degree of correspondence to any real machine by virtual machine 344-2. A system virtual machine may provide a complete system platform that supports execution of a complete operating system ("OS"). A process virtual machine may execute a single program, and may support a single process. In some implementations, virtual machine 344-2 may execute on behalf of a user, and may manage infrastructure of cloud computing environment 342, such as data management, synchronization, or long-duration data transfers.

Virtualized storage 344-3 includes one or more storage systems and/or one or more devices that use virtualization techniques within the storage systems or devices of computing resource 344. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 344-4 provides hardware virtualization techniques that allow multiple operating systems (e.g., "guest operating systems") to execute concurrently on a host computer, such as computing resource 344. Hypervisor 344-4 may present a virtual operating platform to the guest operating systems, and may manage the execution of the guest operating systems. Multiple instances of a variety of operating systems may share virtualized hardware resources.

Network 350 includes one or more wired and/or wireless networks. For example, network 350 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
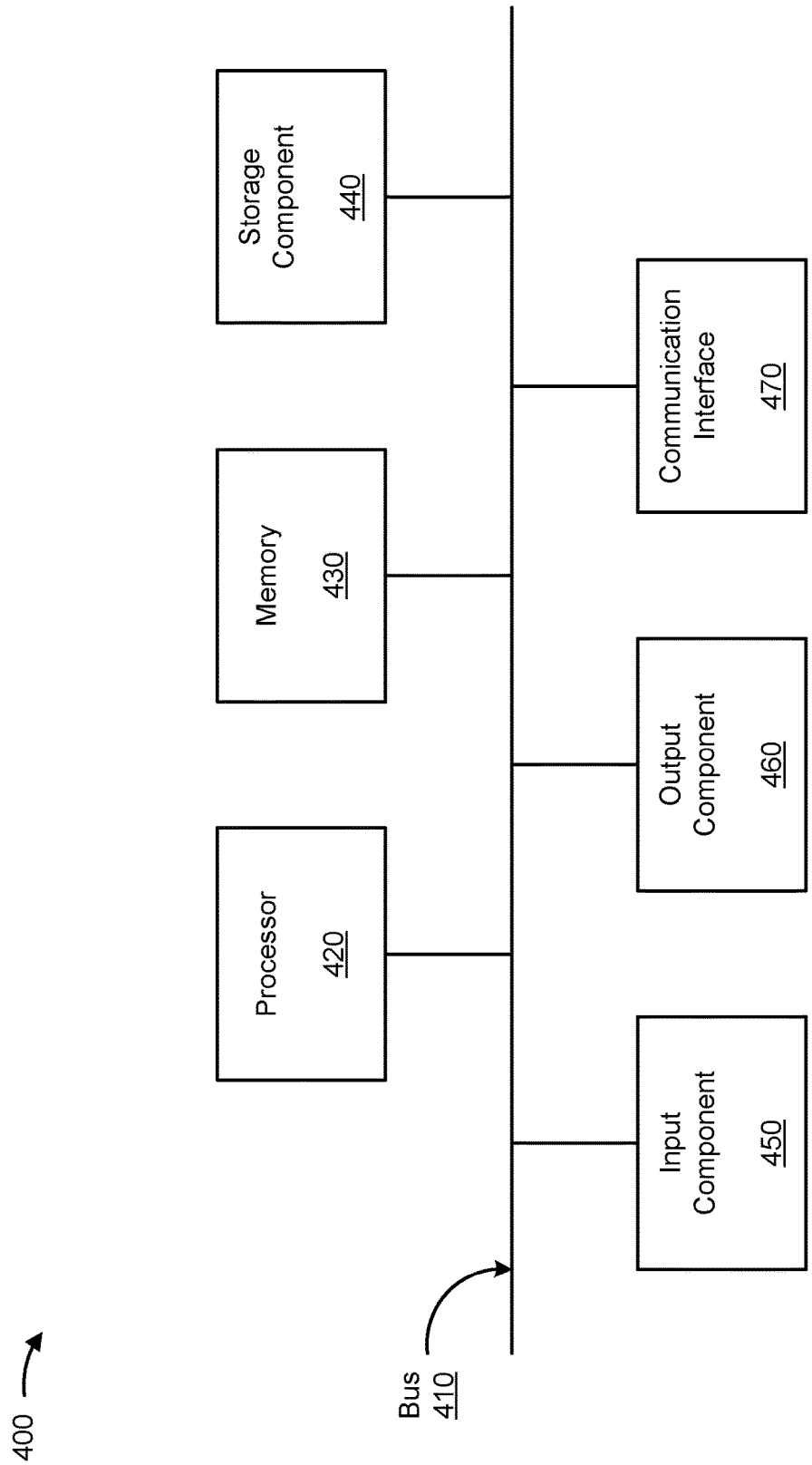
FIG. 4 is a diagram of example components of one or more devices of FIG. 3.

FIG. 4 is a diagram of example components of a device 400. Device 400 may correspond to tag reader gateway device 200, tag reader device 310, camera device 320, tag reader gateway device 330, tag reader platform 340, one or more devices included in network 350, and/or the like. In some implementations, tag reader gateway device 200, tag reader device 310, camera device 320, tag reader gateway device 330, tag reader platform 340, one or more devices included in network 350, and/or the like may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400. As an example, device 400 may include a power supply component, such as a battery-backup power supply component, that enables the device to operate in the absence of power supplied by a main (e.g., wired) power supply.

Figure 5:
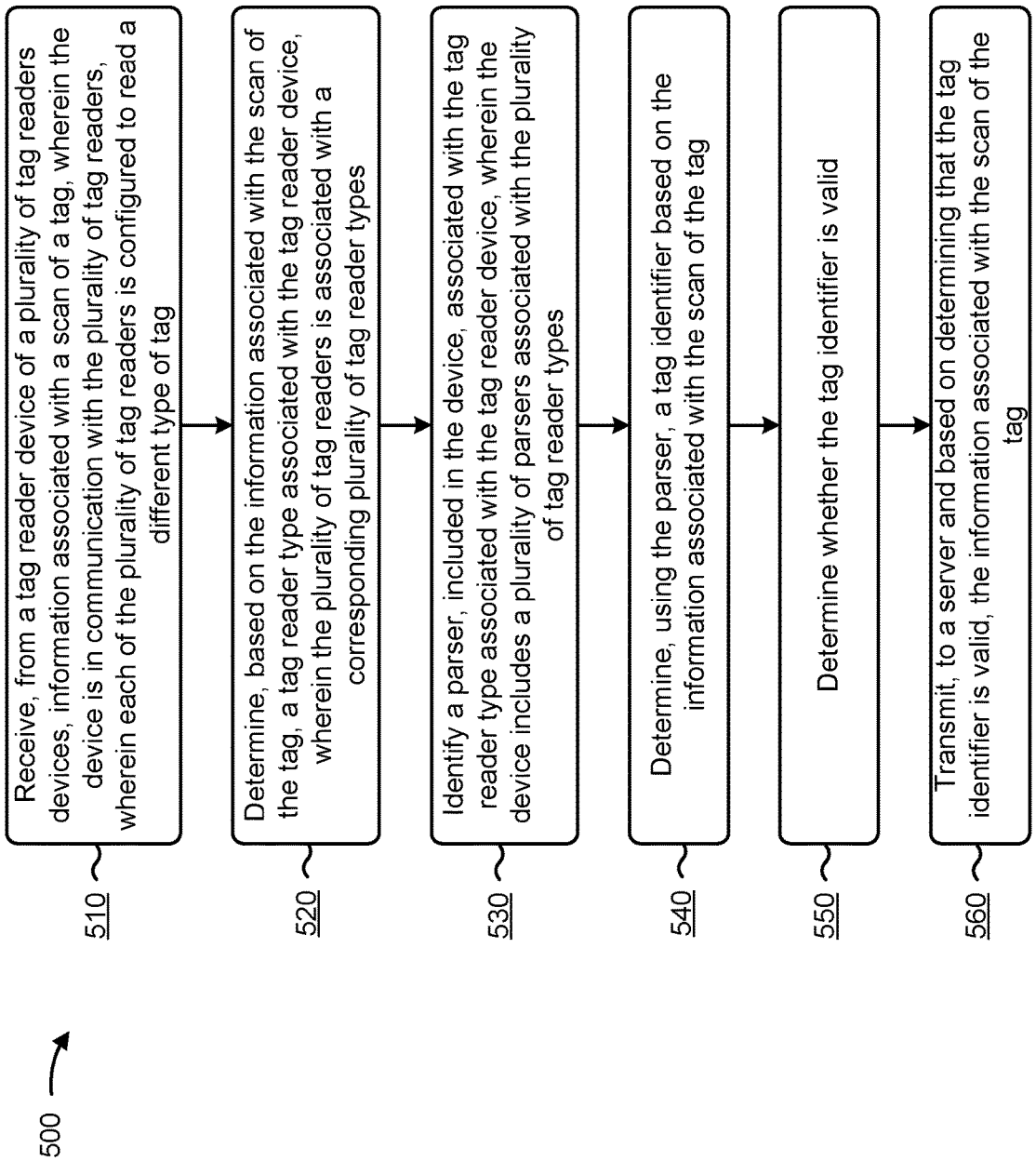
FIG. 5 is a flow chart of an example process for managing a plurality of tag reader devices.

FIG. 5 is a flow chart of an example process 500 for managing a plurality of tag reader devices. In some implementations, one or more process blocks of FIG. 5 may be performed by a device, such as a tag reader gateway device (e.g., tag reader gateway device 330). In some implementations, one or more process blocks of FIG. 5 may be performed by another device or a group of devices separate from or including the device, such as a tag reader device (e.g., tag reader device 310), a camera device (e.g., camera device 320), a tag reader platform (e.g., tag reader platform 340), and/or the like.

As shown in FIG. 5, process 500 may include receiving, from a tag reader device of a plurality of tag readers, information associated with a scan of a tag, wherein the device is in communication with the plurality of tag readers, and wherein each of the plurality of tag readers is configured to read a different type of tag (block 510). For example, the device (e.g., using processor 420, memory 430, storage component 440, input component 450, communication interface 470, and/or the like) may receive, from a tag reader device of a plurality of tag readers, information associated with a scan of a tag, as described above in connection with FIGS. 1A-1G. In some implementations, the device may be in communication with the plurality of tag readers. In some implementations, each of the plurality of tag readers may be configured to read a different type of tag.

As further shown in FIG. 5, process 500 may include determining, based on the information associated with the scan of the tag, a tag reader type associated with the tag reader device, wherein the plurality of tag readers is associated with a corresponding plurality of tag reader types (block 520). For example, the device (e.g., using processor 420, memory 430, storage component 440, and/or the like) may determine, based on the information associated with the scan of the tag, a tag reader type associated with the tag reader device, as described above in connection with FIGS. 1A-1G. In some implementations, the plurality of tag readers may be associated with a corresponding plurality of tag reader types.

As further shown in FIG. 5, process 500 may include identifying a parser, included in the device, associated with the tag reader type associated with the tag reader device, wherein the device includes a plurality of parsers associated with the plurality of tag reader types (block 530). For example, the device (e.g., using processor 420, memory 430, storage component 440, input component 450, communication interface 470, and/or the like) may identify a parser, included in the device, associated with the tag reader type associated with the tag reader device, as described above in connection with FIGS. 1A-1G. In some implementations, the device may include a plurality of parsers associated with the plurality of tag reader types.

As further shown in FIG. 5, process 500 may include determining, using the parser, a tag identifier based on the information associated with the scan of the tag (block 540). For example, the device (e.g., using processor 420, memory 430, storage component 440, and/or the like) may determine, using the parser, a tag identifier based on the information associated with the scan of the tag, as described above in connection with FIGS. 1A-1G.

As further shown in FIG. 5, process 500 may include determining whether the tag identifier is valid (block 550). For example, the device (e.g., using processor 420, memory 430, storage component 440, and/or the like) may determine whether the tag identifier is valid, as described above in connection with FIGS. 1A-1G.

As further shown in FIG. 5, process 500 may include transmitting, to a server and based on determining that the tag identifier is valid, the information associated with the scan of the tag (block 560). For example, the device (e.g., using processor 420, memory 430, storage component 440, output component 460, communication interface 470, and/or the like) may transmit, to a server and based on determining that the tag identifier is valid, the information associated with the scan of the tag, as described above in connection with FIGS. 1A-1G.

Process 500 may include additional implementations, such as any single implementation or any combination of implementations described below and/or in connection with one or more other processes described elsewhere herein.

In some implementations, each tag reader device, of the plurality of tag readers, may be associated with a different tag reader type of the plurality of tag reader types. In some implementations, the different tag reader type may include a radio frequency identifier (RFID) tag reader type, a barcode tag reader type, a Bluetooth tag reader type, a near-field communication (NFC) tag reader type, and/or a RuBee tag reader type.

In some implementations, when receiving the information associated with the scan of the tag, the device may receive the information associated with the scan of the tag via a wireless connection between the device and the tag reader device. In some implementations, the wireless connection may be a ZigBee wireless connection, a Bluetooth Low Energy (BLE) wireless connection, a LoRa wireless connection, and/or a Wi-Fi wireless connection.

In some implementations, the tag reader type, associated with the tag reader device, may be associated with a tag reader type identifier. In some implementations, the information associated with the scan of the tag may include information identifying the tag reader type identifier. In some implementations, when determining the tag reader type associated with the tag reader device, the device may determine the tag reader type based on the information identifying the tag reader type identifier.

In some implementations, the information associated with the scan of the tag may include information identifying a location of the tag reader device, and information identifying the tag identifier. In some implementations, when determining whether the tag identifier is valid, the device may determine whether the tag identifier is valid based on whether a data store, accessible by the device, includes information identifying the tag identifier.

In some implementations, the tag reader type associated with the tag reader device may be a Bluetooth Low Energy (BLE) tag reader type, and/or a ZigBee tag reader type. In some implementations, when receiving the information associated with the scan of the tag, the device may receive the information associated with the scan of the tag based on a signal strength measurement associated with the scan satisfying a threshold signal strength.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
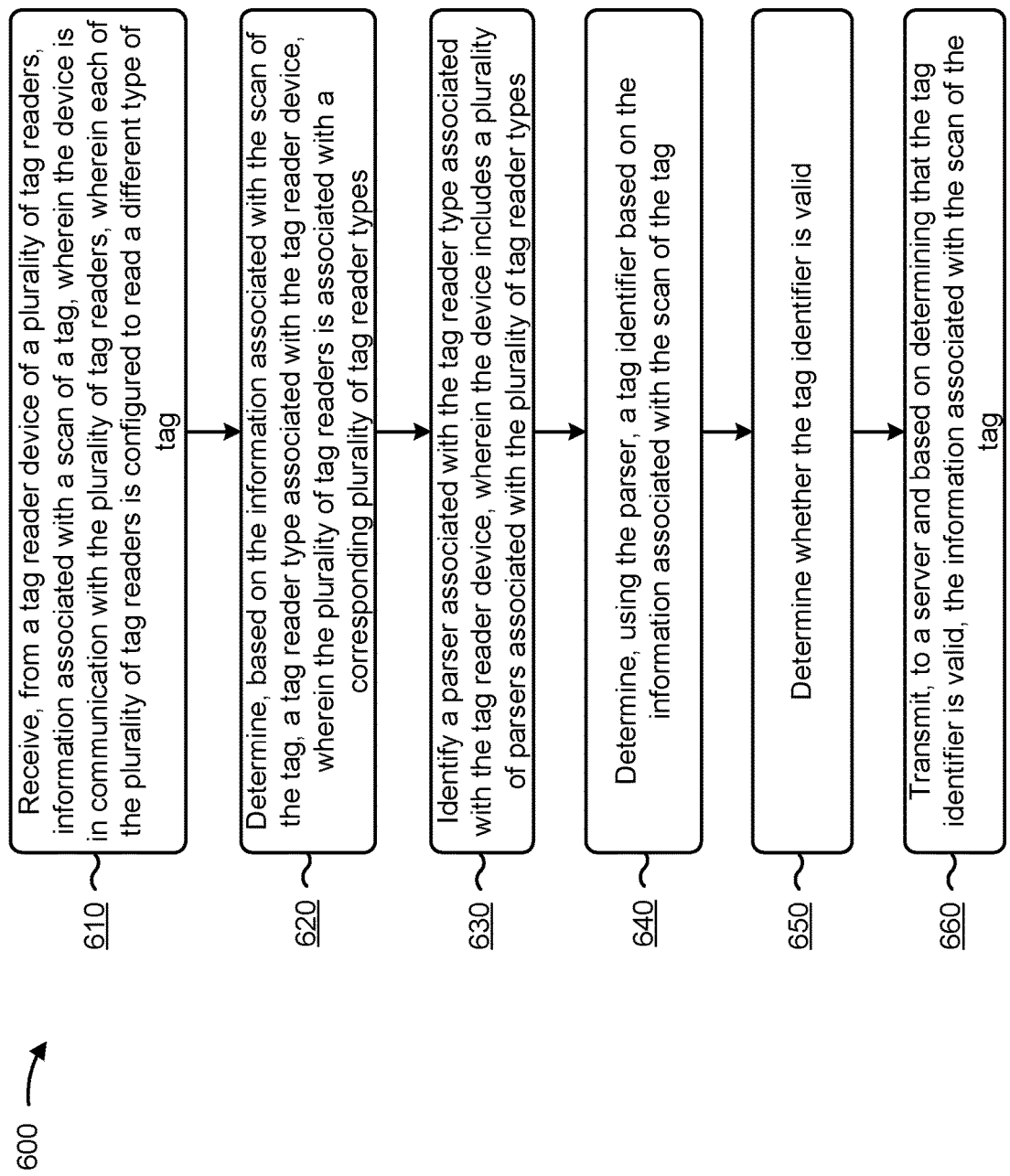
FIG. 6 is a flow chart of an example process for managing a plurality of tag reader devices.

FIG. 6 is a flow chart of an example process 600 for managing a plurality of tag reader devices. In some implementations, one or more process blocks of FIG. 6 may be performed by a device, such as a tag reader gateway device (e.g., tag reader gateway device 330). In some implementations, one or more process blocks of FIG. 6 may be performed by another device or a group of devices separate from or including the device, such as a tag reader device (e.g., tag reader device 310), a camera device (e.g., camera device 320), a tag reader platform (e.g., tag reader platform 340), and/or the like.

As shown in FIG. 6, process 600 may include receiving, from a tag reader device of a plurality of tag readers, information associated with a scan of a tag, wherein the device is in communication with the plurality of tag readers, and wherein each of the plurality of tag readers is configured to read a different type of tag (block 610). For example, the device (e.g., using processor 420, memory 430, storage component 440, input component 450, communication interface 470, and/or the like) may receive, from a tag reader device of a plurality of tag readers, information associated with a scan of a tag, as described above in connection with FIGS. 1A-1G. In some implementations, the device may be in communication with the plurality of tag readers. In some implementations, each of the plurality of tag readers may be configured to read a different type of tag.

As further shown in FIG. 6, process 600 may include determining, based on the information associated with the scan of the tag, a tag reader type associated with the tag reader device, wherein the plurality of tag readers is associated with a corresponding plurality of tag reader types (block 620). For example, the device (e.g., using processor 420, memory 430, storage component 440, and/or the like) may determine, based on the information associated with the scan of the tag, a tag reader type associated with the tag reader device, as described above in connection with FIGS. 1A-1G. In some implementations, the plurality of tag readers may be associated with a corresponding plurality of tag reader types.

As further shown in FIG. 6, process 600 may include identifying a parser associated with the tag reader type associated with the tag reader device, wherein the device includes a plurality of parsers associated with the plurality of tag reader types (block 630). For example, the device (e.g., using processor 420, memory 430, storage component 440, and/or the like) may identify a parser associated with the tag reader type associated with the tag reader device, as described above in connection with FIGS. 1A-1G. In some implementations, the device may include a plurality of parsers associated with the plurality of tag reader types.

As further shown in FIG. 6, process 600 may include determining, using the parser, a tag identifier based on the information associated with the scan of the tag (block 640). For example, the device (e.g., using processor 420, memory 430, storage component 440, and/or the like) may determine, using the parser, a tag identifier based on the information associated with the scan of the tag, as described above in connection with FIGS. 1A-1G.

As further shown in FIG. 6, process 600 may include determining whether the tag identifier is valid (block 650). For example, the device (e.g., using processor 420, memory 430, storage component 440, and/or the like) may determine whether the tag identifier is valid, as described above in connection with FIGS. 1A-1G.

As further shown in FIG. 6, process 600 may include transmitting, to a server and based on determining that the tag identifier is valid, the information associated with the scan of the tag (block 660). For example, the device (e.g., using processor 420, memory 430, storage component 440, output component 460, communication interface 470, and/or the like) may transmit, to a server and based on determining that the tag identifier is valid, the information associated with the scan of the tag, as described above in connection with FIGS. 1A-1G.

Process 600 may include additional implementations, such as any single implementation or any combination of implementations described below and/or in connection with one or more other processes described elsewhere herein.

In some implementations, the information associated with the scan of the tag may include information identifying the tag reader type associated with the tag reader device, information identifying a location of the tag reader device, information identifying a time associated with the scan of the tag, and information identifying the tag identifier.

In some implementations, the tag reader type, associated with the tag reader device, may be associated with a tag reader type identifier. In some implementations, the information associated with the scan of the tag may include information identifying the tag reader type identifier. In some implementations, when determining the tag reader type associated with the tag reader device, the device may identify, in the information associated with the scan of the tag, the information identifying the tag reader type identifier, and may determine that the tag reader type identifier is associated with the tag reader type.

In some implementations, when determining whether the tag identifier is valid, the device may determine whether a data store, accessible by the device, includes information identifying the tag identifier, and may determine that the tag identifier is valid based on determining that the data store includes the information identifying the tag identifier, or determine that the tag identifier is not valid based on determining that the data store does not include the information identifying the tag identifier.

In some implementations, the device may transmit, to a camera and based on determining that the tag identifier is valid, an instruction to capture a video associated with the tag reader device, and/or an image associated with the tag reader device. Additionally, the device may receive, based on transmitting the instruction, an electronic file including the video or the image.

In some implementations, the device may receive, from the tag reader device and after determining that the tag identifier is valid, information associated with another scan of the tag, may determine whether a time duration between a first time associated with the scan of the tag and a second time associated with the other scan of the tag satisfies a time duration threshold, and may determine, based on determining that the time duration satisfies the time duration threshold, to not transmit the information associated with the other scan of the tag to the server.

In some implementations, the device may determine, prior to receiving the information associated with the scan of the tag, that information identifying the tag identifier is stored in a first data store on the server, may determine, based on determining that the information identifying the tag identifier is stored in the first data store on the server, that the information identifying the tag identifier is not stored in a second data store of the device, may obtain, based on determining the information identifying the tag identifier is not stored in the second data store of the device, the information identifying the tag identifier from the first data store on the server, and may store, based on obtaining the information identifying the tag identifier from the first data store on the server, the information identifying the tag identifier in the second data store of the device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
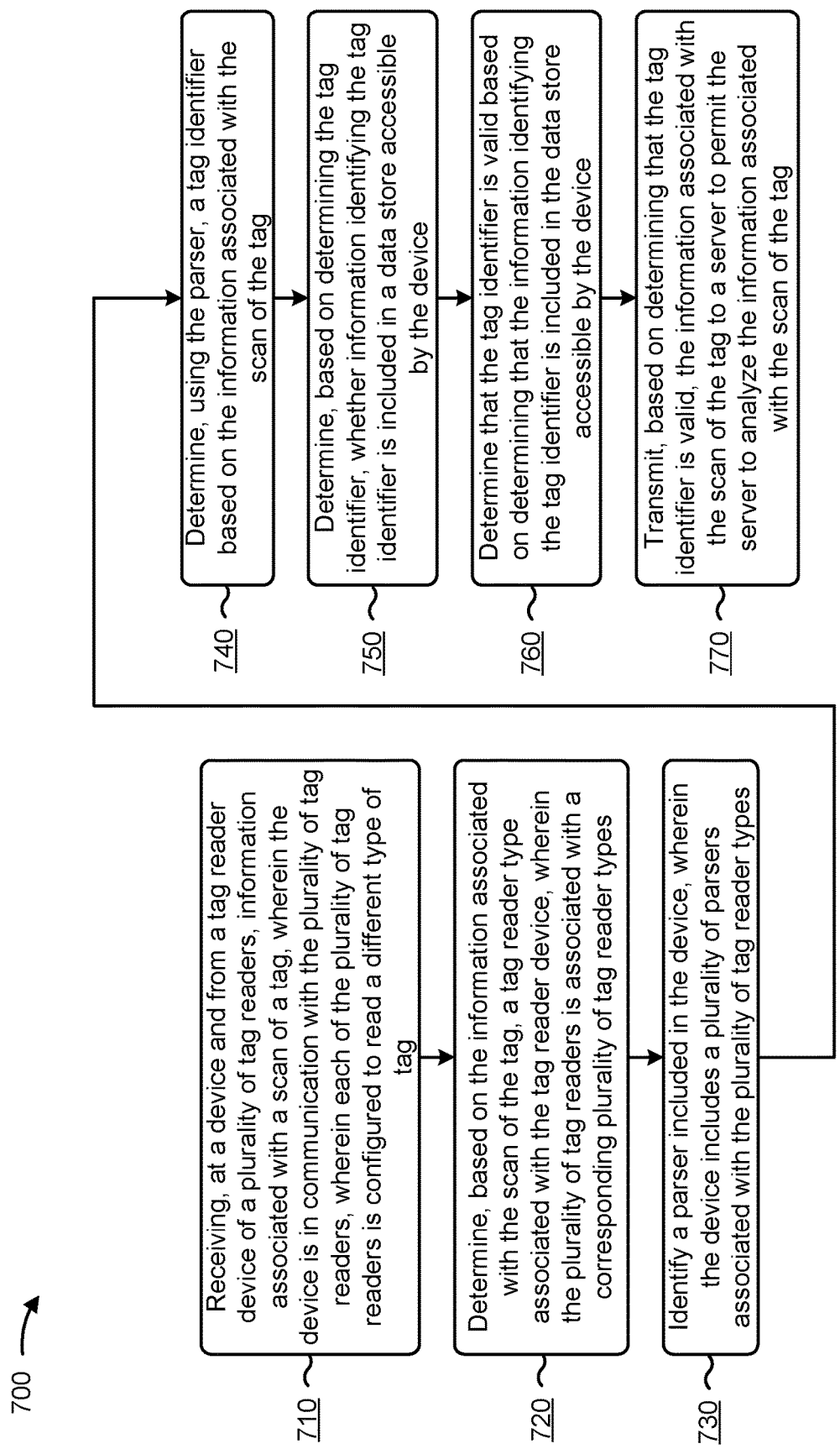
FIG. 7 is a flow chart of an example process for managing a plurality of tag reader devices.

FIG. 7 is a flow chart of an example process 700 for managing a plurality of tag reader devices. In some implementations, one or more process blocks of FIG. 7 may be performed by a device, such as a tag reader gateway device (e.g., tag reader gateway device 330). In some implementations, one or more process blocks of FIG. 7 may be performed by another device or a group of devices separate from or including the device, such as a tag reader device (e.g., tag reader device 310), a camera device (e.g., camera device 320), a tag reader platform (e.g., tag reader platform 340), and/or the like.

As shown in FIG. 7, process 700 may include receiving, from a tag reader device of a plurality of tag readers, information associated with a scan of a tag, wherein the device is in communication with the plurality of tag readers, and wherein each of the plurality of tag readers is configured to read a different type of tag (block 710). For example, the device (e.g., using processor 420, memory 430, storage component 440, input component 450, communication interface 470, and/or the like) may receive, from a tag reader device of a plurality of tag readers, information associated with a scan of a tag, as described above in connection with FIGS. 1A-1G. In some implementations, the device may be in communication with the plurality of tag readers. In some implementations, each of the plurality of tag readers may be configured to read a different type of tag.

As further shown in FIG. 7, process 700 may include determining, based on the information associated with the scan of the tag, a tag reader type associated with the tag reader device, wherein the plurality of tag readers is associated with a corresponding plurality of tag reader types (block 720). For example, the device (e.g., using processor 420, memory 430, storage component 440, and/or the like) may determine, based on the information associated with the scan of the tag, a tag reader type associated with the tag reader device, as described above in connection with FIGS. 1A-1G. In some implementations, the plurality of tag readers may be associated with a corresponding plurality of tag reader types.

As further shown in FIG. 7, process 700 may include identifying a parser included in the device, wherein the device includes a plurality of parsers associated with the plurality of tag reader types (block 730). For example, the device (e.g., using processor 420, memory 430, storage component 440, and/or the like) may identify a parser included in the device, as described above in connection with FIGS. 1A-1G. In some implementations, the device may include a plurality of parsers associated with the plurality of tag reader types.

As further shown in FIG. 7, process 700 may include determining, using the parser, a tag identifier based on the information associated with the scan of the tag (block 740). For example, the device (e.g., using processor 420, memory 430, storage component 440, input component 450, communication interface 470, and/or the like) may determine determining, by the device and using the parser, a tag identifier based on the information associated with the scan of the tag, as described above in connection with FIGS. 1A-1G.

As further shown in FIG. 7, process 700 may include determining, based on determining the tag identifier, whether information identifying the tag identifier is included in a data store accessible by the device (block 750). For example, the device (e.g., using processor 420, memory 430, storage component 440, and/or the like) may determine, based on determining the tag identifier, whether information identifying the tag identifier is included in a data store accessible by the device, as described above in connection with FIGS. 1A-1G.

As further shown in FIG. 7, process 700 may include determining that the tag identifier is valid based on determining that the information identifying the tag identifier is included in the data store accessible by the device (block 760). For example, the device (e.g., using processor 420, memory 430, storage component 440, and/or the like) may determine that the tag identifier is valid based on determining that the information identifying the tag identifier is included in the data store accessible by the device, as described above in connection with FIGS. 1A-1G.

As further shown in FIG. 7, process 700 may include transmitting, based on determining that the tag identifier is valid, the information associated with the scan of the tag to a server to permit the server to analyze the information associated with the scan of the tag (block 770). For example, the device (e.g., using processor 420, memory 430, storage component 440, output component 460, communication interface 470, and/or the like) may transmit, based on determining that the tag identifier is valid, the information associated with the scan of the tag to a server to permit the server to analyze the information associated with the scan of the tag, as described above in connection with FIGS. 1A-1G.

Process 700 may include additional implementations, such as any single implementation or any combination of implementations described below and/or in connection with one or more other processes described elsewhere herein.

In some implementations, the tag reader type may include a radio frequency identifier (RFID) tag reader type, a barcode tag reader type, a Bluetooth tag reader type, a near-field communication (NFC) tag reader type, and/or a RuBee tag reader type. In some implementations, a wireless connection between the tag reader device and the device may include a ZigBee wireless connection, a Bluetooth Low Energy (BLE) wireless connection, a LoRa wireless connection, and/or a Wi-Fi wireless connection.

In some implementations, the device may receive, from the tag reader device and after determining that the tag identifier is valid, information associated with a plurality of other scans of the tag, may determine whether a time duration between a first time associated with the scan of the tag and each of a plurality of second times associated with the plurality of other scans of the tag satisfies a time duration threshold, and may determine, based on determining that the time duration satisfies the time duration threshold, to not transmit the information associated with the plurality of other scans of the tag to the server.

In some implementations, each of the plurality of parsers may be associated with a different tag reader type, and the different tag reader type may include a radio frequency identifier (RFID) tag reader type, a barcode tag reader type, a Bluetooth tag reader type, a near-field communication (NFC) tag reader type, or a RuBee tag reader type.

In some implementations, the device may determine a version of a driver associated with the tag reader device, may determine, based on determining the version of the driver associated with the tag reader device, an updated version of the driver associated with the tag reader device, and may provide, to the tag reader device and based on determining the updated version of the driver, the updated version of the driver and an instruction to install the updated version of the driver on the tag reader device.

In some implementations, the device may determine a version of a driver, associated with the tag reader device, stored in another data store accessible by the device, may determine, based on determining the version of the driver, that the server is storing an updated version of the driver associated with the tag reader device, may obtain, based on determining that the server is storing the updated version of the driver, the updated version of the driver from the server, and may cause, based on obtaining the updated version of the driver, the updated version of the driver to be stored in the other data store accessible by the device Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some implementations described herein provide a tag reader gateway device 330 that is capable of managing a plurality of tag reader devices 310 that are configured to read a different type of tag. The tag reader gateway device 330 may receive, from a tag reader device 310 of the plurality of tag reader devices 310, information associated with a scan of a tag. The tag reader gateway device 330 may determine, based on the information associated with the scan of the tag, a tag reader type associated with the tag reader device 310. The plurality of tag readers may be associated with a corresponding plurality of tag reader types. The tag reader gateway device may identify a parser, included in the device, associated with the tag reader type associated with the tag reader device 310, wherein the tag reader gateway device 330 may include a plurality of parsers associated with the plurality of tag reader types. The tag reader gateway device 330 may determine, using the parser, a tag identifier based on the information associated with the scan of the tag, and may determine whether the tag identifier is valid. The tag reader gateway device 330 may transmit the information associated with the scan of the tag to a server based on determining that the tag identifier is valid.

In this way, the tag reader gateway device 330 reduces the complexity of the network by reducing the quantity of tag reader gateway devices 330 used to manage the plurality of tag reader devices 310 in the network, which reduces the quantity of connections to the tag reader platform 340. Moreover, in this way, the tag reader gateway device 330 determines the validity of a tag identifier, and may not transmit the information associated with a scan of a tag, associated with the tag identifier, to the server if the tag identifier is determined to be invalid, which conserves processing, network, and storage resources that would have otherwise been used to transmit and store the information associated with the scan of the tag.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive, from a tag reader device of a plurality of tag readers, information associated with a scan of a tag,
         wherein the device is in communication with the plurality of tag readers,
            wherein each of the plurality of tag readers is configured to read a different type of tag;
      determine, based on the information associated with the scan of the tag, a tag reader type associated with the tag reader device,
         wherein the plurality of tag readers is associated with a corresponding plurality of tag reader types,
         wherein the plurality of tag reader types include at least two of:
            a radio frequency identifier (RFID) tag reader type,
            a barcode tag reader type,
            a Bluetooth tag reader type, a near-field communication (NFC) tag reader type, or
a RuBee tag reader type;
identify a parser, included in the device, associated with the tag reader type associated with the tag reader device,
wherein the device includes a plurality of parsers associated with the plurality of tag reader types, and
wherein each of the plurality of tag reader types is associated with a different parser of the plurality of parsers;
determine, using the parser, a tag identifier based on the information associated with the scan of the tag;
determine whether the tag identifier is valid;
transmit, to a server and based on determining that the tag identifier is valid, the information associated with the scan of the tag;
determine, based on determining that information identifying the tag identifier is stored in a first data store on the server, that the information identifying the tag identifier is not stored in a second data store of the device;
obtain, based on determining the information identifying the tag identifier is not stored in the second data store of the device, the information identifying the tag identifier from the first data store on the server; and
store, based on obtaining the information identifying the tag identifier from the first data store on the server, the information identifying the tag identifier in the second data store of the device.

2. The device of claim 1, wherein each tag reader device, of the plurality of tag readers, is associated with a different tag reader type of the plurality of tag reader types.

3. The device of claim 1, wherein the one or more processors, when receiving the information associated with the scan of the tag, are further to:
receive the information associated with the scan of the tag via a wireless connection between the device and the tag reader device,
wherein the wireless connection is at least one of:
a ZigBee wireless connection,
a Bluetooth Low Energy (BLE) wireless connection,
a LoRa wireless connection, or
a Wi-Fi wireless connection.

4. The device of claim 1, wherein the tag reader type, associated with the tag reader device, is associated with a tag reader type identifier,
wherein the information associated with the scan of the tag includes information identifying the tag reader type identifier, and
wherein the one or more processors, when determining the tag reader type associated with the tag reader device, are to:
determine the tag reader type based on the information identifying the tag reader type identifier.

5. The device of claim 1, wherein the information associated with the scan of the tag includes:
information identifying a location of the tag reader device, and
the information identifying the tag identifier.

6. The device of claim 1, wherein the one or more processors, when determining whether the tag identifier is valid, are to:
determine whether the tag identifier is valid based on whether a data store, accessible by the device, includes the information identifying the tag identifier.

7. The device of claim 1, wherein the one or more processors, when receiving the information associated with the scan of the tag, are to:
receive the information associated with the scan of the tag based on a signal strength measurement associated with the scan satisfying a threshold signal strength.

8. A non-transitory computer-readable medium storing instructions, the instructions comprising:
one or more instructions that, when executed by one or more processors of a device, cause the one or more processors to:
receive, from a tag reader device of a plurality of tag readers, information associated with a scan of a tag,
wherein the device is in communication with the plurality of tag readers,
wherein each of the plurality of tag readers is configured to read a different type of tag;
determine, based on the information associated with the scan of the tag, a tag reader type associated with the tag reader device,
wherein the plurality of tag readers is associated with a corresponding plurality of tag reader types,
wherein the plurality of tag reader types include at least two of:
a radio frequency identifier (RFID) tag reader type,
a barcode tag reader type,
a Bluetooth tag reader type,
a near-field communication (NFC) tag reader type, or
a RuBee tag reader type;
identify a parser associated with the tag reader type associated with the tag reader device,
wherein the device includes a plurality of parsers associated with the plurality of tag reader types, and
wherein each of the plurality of tag reader types is associated with a different parser of the plurality of parsers;
determine, using the parser, a tag identifier based on the information associated with the scan of the tag;
determine whether the tag identifier is valid;
transmit, to a server and based on determining that the tag identifier is valid, the information associated with the scan of the tag;
determine, based on determining that information identifying the tag identifier is stored in a first data store on the server, that the information identifying the tag identifier is not stored in a second data store of the device;
obtain, based on determining the information identifying the tag identifier is not stored in the second data store of the device, the information identifying the tag identifier from the first data store on the server; and
store, based on obtaining the information identifying the tag identifier from the first data store on the server, the information identifying the tag identifier in the second data store of the device.

9. The non-transitory computer-readable medium of claim 8, wherein the information associated with the scan of the tag includes:

information identifying the tag reader type associated with the tag reader device,
information identifying a location of the tag reader device,
information identifying a time associated with the scan of the tag, and
the information identifying the tag identifier.

10. The non-transitory computer-readable medium of claim 8, wherein the tag reader type, associated with the tag reader device, is associated with a tag reader type identifier,
wherein the information associated with the scan of the tag includes information identifying the tag reader type identifier, and
wherein the one or more instructions, that cause the one or more processors to determine the tag reader type associated with the tag reader device, cause the one or more processors to:
identify, in the information associated with the scan of the tag, the information identifying the tag reader type identifier; and
determine that the tag reader type identifier is associated with the tag reader type.

11. The non-transitory computer-readable medium of claim 8, wherein the one or more instructions, that cause the one or more processors to determine whether the tag identifier is valid, cause the one or more processors to:
determine whether a data store, accessible by the device, includes the information identifying the tag identifier; and
determine that the tag identifier is valid based on determining that the data store includes the information identifying the tag identifier, or
determine that the tag identifier is not valid based on determining that the data store does not include the information identifying the tag identifier.

12. The non-transitory computer-readable medium of claim 8, wherein the one or more instructions, when executed by the one or more processors, cause the one or more processors to:
transmit, to a camera and based on determining that the tag identifier is valid, an instruction to capture at least one of:
a video associated with the tag reader device, or
an image associated with the tag reader device;
receive, based on transmitting the instruction, an electronic file including the video or the image; and
transmit, based on receiving the electronic file, the electronic file to the server.

13. The non-transitory computer-readable medium of claim 8, wherein the one or more instructions, when executed by the one or more processors, further cause the one or more processors to:
receive, from the tag reader device and after determining that the tag identifier is valid, information associated with another scan of the tag;
determine whether a time duration between a first time associated with the scan of the tag and a second time associated with the other scan of the tag satisfies a time duration threshold; and
determine, based on determining that the time duration satisfies the time duration threshold, to not transmit the information associated with the other scan of the tag to the server.

14. A method, comprising:
receiving, at a device and from a tag reader device of a plurality of tag readers, information associated with a scan of a tag,
wherein the device is in communication with the plurality of tag readers,
wherein each of the plurality of tag readers is configured to read a different type of tag;
determining, by the device and based on the information associated with the scan of the tag, a tag reader type associated with the tag reader device,
wherein the plurality of tag readers is associated with a corresponding plurality of tag reader types,
wherein the plurality of tag reader types include at least two of:
a radio frequency identifier (RFID) tag reader type,
a barcode tag reader type,
a Bluetooth tag reader type,
a near-field communication (NFC) tag reader type, or
a RuBee tag reader type;
identifying, by the device, a parser included in the device,
wherein the device includes a plurality of parsers associated with the plurality of tag reader types, and
wherein each of the plurality of tag reader types is associated with a different parser of the plurality of parsers;
determining, by the device and using the parser, a tag identifier based on the information associated with the scan of the tag;
determining by the device and based on determining the tag identifier, whether information identifying the tag identifier is included in a data store accessible by the device;
determining, by the device, that the tag identifier is valid based on determining that the information identifying the tag identifier is included in the data store accessible by the device;
transmitting, by the device and based on determining that the tag identifier is valid, the information associated with the scan of the tag to a server to permit the server to analyze the information associated with the scan of the tag;
transmitting, by the device, to a camera and based on determining that the tag identifier is valid, an instruction to capture at least one of:
a video associated with the tag reader device, or
an image associated with the tag reader device;
receiving, by the device and based on transmitting the instruction, an electronic file including the video or the image; and
transmitting, by the device and based on receiving the electronic file, the electronic file to the server.

15. The method of claim 14,
wherein a wireless connection between the tag reader device and the device includes at least one of:
a ZigBee wireless connection,
a Bluetooth Low Energy (BLE) wireless connection,
a LoRa wireless connection, or
a Wi-Fi wireless connection.

16. The method of claim 14, further comprising:
receiving, from the tag reader device and after determining that the tag identifier is valid, information associated with a plurality of other scans of the tag;
determining whether a time duration between a first time associated with the scan of the tag and each of a plurality of second times associated with the plurality of other scans of the tag satisfies a time duration threshold; and determining, based on determining that the time duration satisfies the time duration threshold, to not transmit the information associated with the plurality of other scans of the tag to the server.

17. The method of claim 14, further comprising:
determining a version of a driver associated with the tag reader device;
determining, based on determining the version of the driver associated with the tag reader device, an updated version of the driver associated with the tag reader device; and
providing, to the tag reader device and based on determining the updated version of the driver, the updated version of the driver and an instruction to install the updated version of the driver on the tag reader device.

18. The method of claim 14, further comprising:
determining a version of a driver, associated with the tag reader device, stored in another data store accessible by the device;
determining, based on determining the version of the driver, that the server is storing an updated version of the driver associated with the tag reader device;
obtaining, based on determining that the server is storing the updated version of the driver, the updated version of the driver from the server; and
causing, based on obtaining the updated version of the driver, the updated version of the driver to be stored in the other data store accessible by the device.

19. The method of claim 14, wherein each tag reader device, of the plurality of tag readers, is associated with a different tag reader type of the plurality of tag reader types.

20. The method of claim 14, wherein the information associated with the scan of the tag includes:
information identifying a location of the tag reader device, and
the information identifying the tag identifier.

\* \* \* \* \*